(12) United States Patent
DeMong

(10) Patent No.: US 7,866,462 B2
(45) Date of Patent: Jan. 11, 2011

(54) BELT TYPE CONVEYOR APPARATUS WITH ADJUSTABLE TAIL PULLEY

(75) Inventor: Maurice DeMong, Wakaw (CA)

(73) Assignee: Prairie Machines & Parts Mfg. (1978) Ltd., Saskatoon (CA)

( * ) Notice: Subject to any disclaimer, the term of this patent is extended or adjusted under 35 U.S.C. 154(b) by 0 days.

(21) Appl. No.: 12/462,278

(22) Filed: Jul. 30, 2009

(65) Prior Publication Data

US 2009/0288933 A1 Nov. 26, 2009

Related U.S. Application Data

(63) Continuation of application No. PCT/CA2008/000245, filed on Feb. 7, 2008.

(30) Foreign Application Priority Data

Feb. 8, 2007 (CA) .................................. 2578427

(51) Int. Cl.
  B65G 43/00 (2006.01)
  B65G 39/16 (2006.01)
(52) U.S. Cl. ............................ 198/810.04; 198/810.03; 198/806; 198/300
(58) Field of Classification Search ............ 198/810.03, 198/810.04, 813, 806, 807, 810.01, 814, 198/842
See application file for complete search history.

(56) References Cited

U.S. PATENT DOCUMENTS

| | | | | |
|---|---|---|---|---|
| 2,160,057 A | * | 5/1939 | Carus et al. .................. | 198/806 |
| 2,457,569 A | * | 12/1948 | Lee ............................. | 414/528 |
| 2,725,757 A | | 12/1955 | Murphy | |
| 2,781,670 A | * | 2/1957 | Kindig ........................ | 198/806 |
| 2,909,273 A | | 10/1959 | Smith | |
| 2,914,957 A | | 12/1959 | Johnson | |
| 2,920,750 A | * | 1/1960 | Couch .......................... | 198/842 |
| 2,986,266 A | | 5/1961 | Moon | |
| 2,990,051 A | * | 6/1961 | Moon .......................... | 198/813 |
| 3,118,314 A | | 1/1964 | Schuster | |
| 3,278,002 A | | 10/1966 | Robins | |
| 3,543,597 A | | 12/1970 | Schamphelaere et al. | |
| 3,545,599 A | | 12/1970 | Smith et al. | |
| 3,638,781 A | * | 2/1972 | Comley .................. | 198/810.04 |

(Continued)

FOREIGN PATENT DOCUMENTS

CA 956258 10/1974

(Continued)

*Primary Examiner*—Gene Crawford
*Assistant Examiner*—William R Harp
(74) *Attorney, Agent, or Firm*—Lipsitz & McAllister, LLC

(57) ABSTRACT

A conveyor apparatus for use with a conveyor belt includes an elongate conveyor support frame and a plurality of conveyor support devices mounted on this frame. These devices include a tail pulley mechanism having two tail pulley sections mounted on a pulley support for rotation about a common central axis of rotation. The pulley support includes a central support portion located at inner ends of the pulley sections and extending radially outwardly from these inner ends to a vertically extending pivot axis. An interconnecting support arrangement mounts the pulley support on the conveyor support frame and includes a pivot connector connecting the central support portion for pivotable movement about the pivot axis. An actuator can pivot the pulley support about the pivot axis to maintain the conveyor belt within a central region of the tail pulley.

19 Claims, 20 Drawing Sheets

U.S. PATENT DOCUMENTS

| | | |
|---|---|---|
| 3,701,411 A | 10/1972 | McGinnis |
| 3,956,632 A * | 5/1976 | Hall et al. ............... 250/223 R |
| 4,245,738 A | 1/1981 | Butcher et al. |
| 4,860,634 A * | 8/1989 | Hein ........................ 91/363 R |
| 5,131,528 A | 7/1992 | Bandy, Jr. |
| 5,366,059 A | 11/1994 | Demong |
| 5,515,139 A * | 5/1996 | Hou et al. ..................... 399/38 |
| 5,659,851 A | 8/1997 | Moe et al. |
| 5,743,378 A * | 4/1998 | Hovst.o slashed. et al. .. 198/806 |
| 5,788,058 A | 8/1998 | Girardey |
| 5,992,941 A | 11/1999 | Delli-Gatti, Jr. |
| 6,308,819 B1 | 10/2001 | Riffe |
| 6,405,854 B1 | 6/2002 | Cumberlege |
| 6,712,200 B2 | 3/2004 | Ubaldi |
| 6,823,978 B2 | 11/2004 | Preuninger et al. |
| 7,070,042 B2 * | 7/2006 | Dow et al. .................. 198/835 |
| 7,131,529 B2 | 11/2006 | Meade |
| 2002/0034400 A1 | 3/2002 | Asuwa et al. |
| 2005/0150747 A1 | 7/2005 | Menendez et al. |

FOREIGN PATENT DOCUMENTS

| | | |
|---|---|---|
| CA | 1102732 | 6/1981 |
| CA | 2077039 | 2/1994 |
| CA | 2282438 | 9/1998 |
| CA | 2293238 | 2/1999 |

* cited by examiner

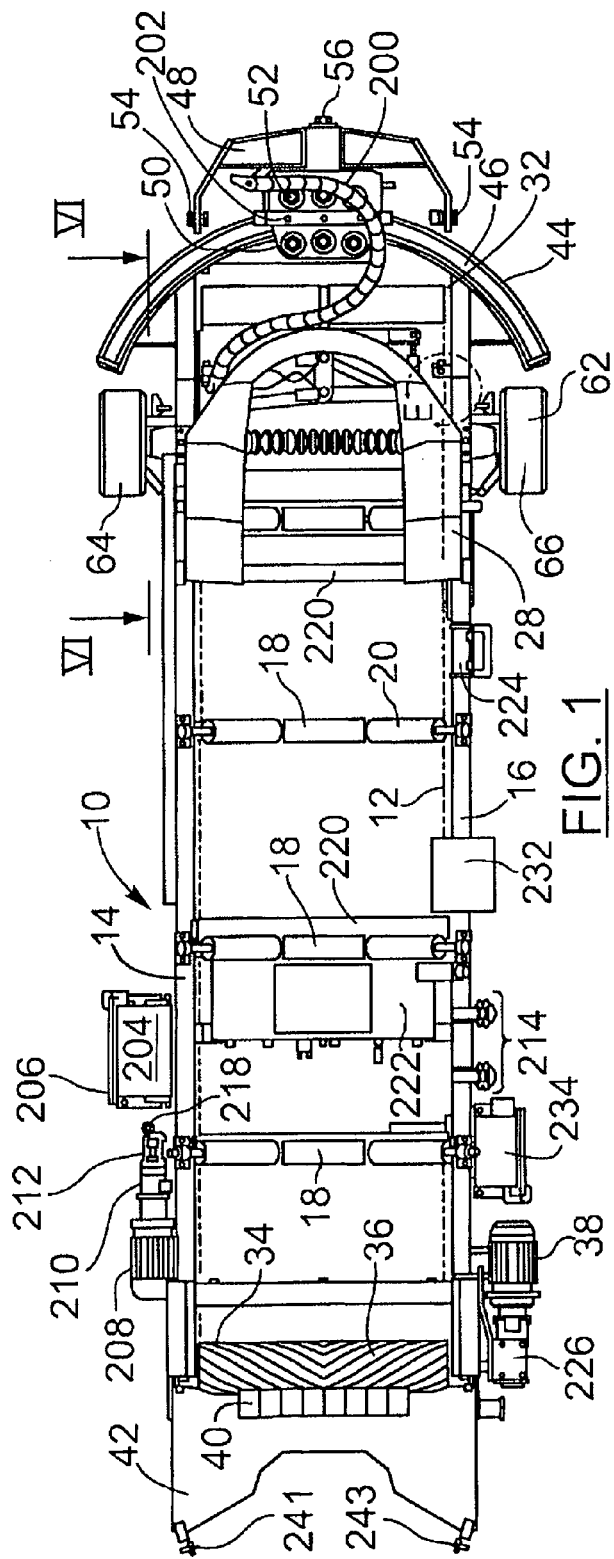
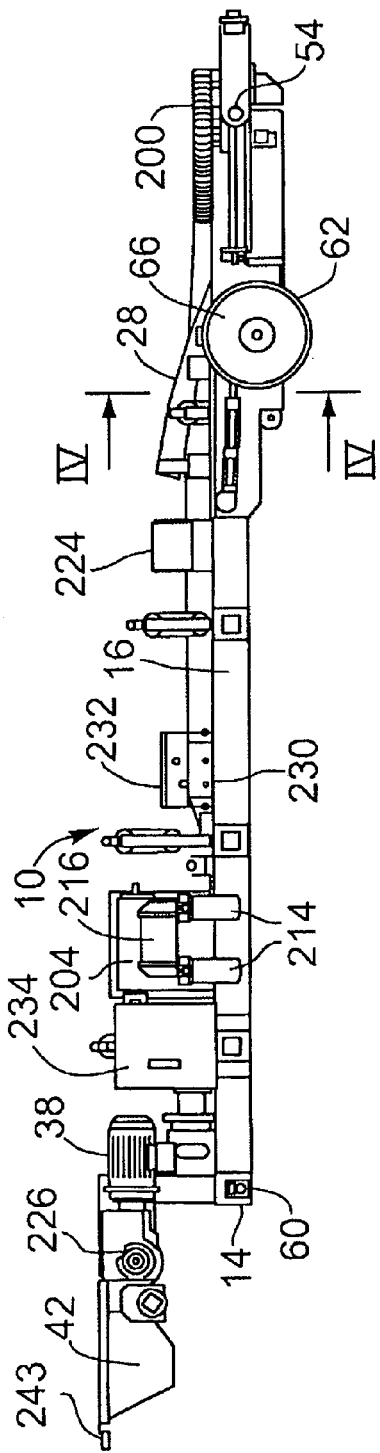
FIG. 1
FIG. 2

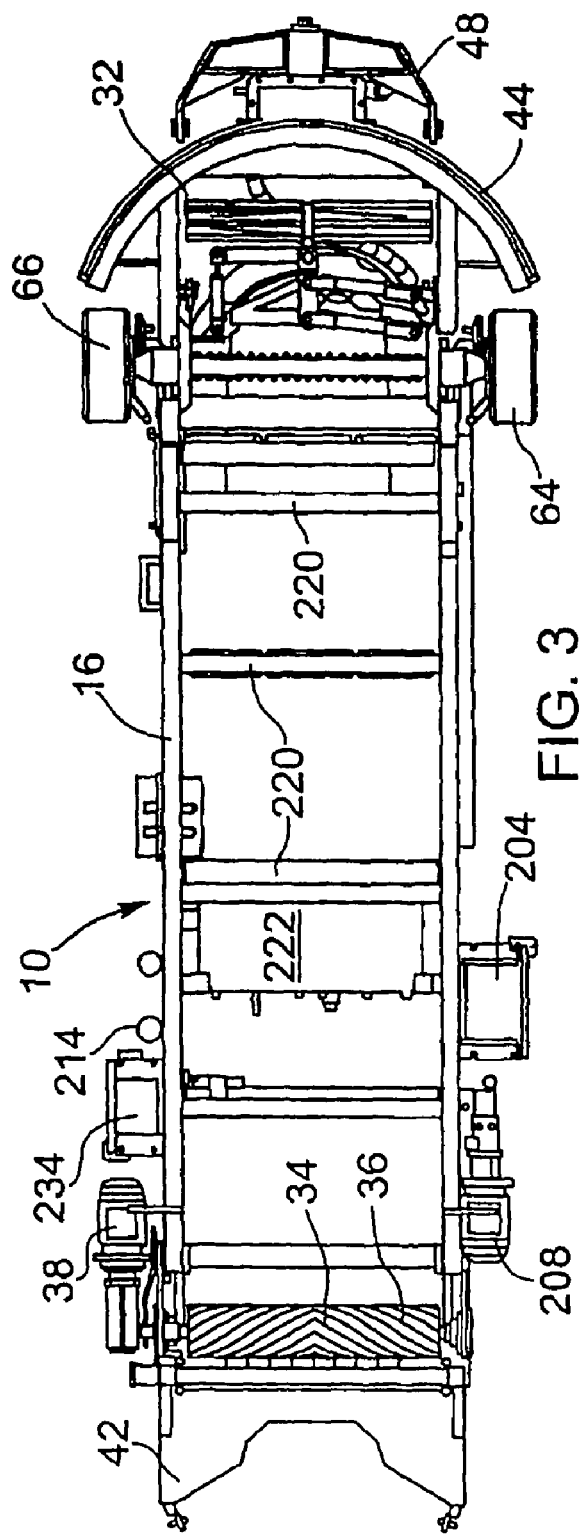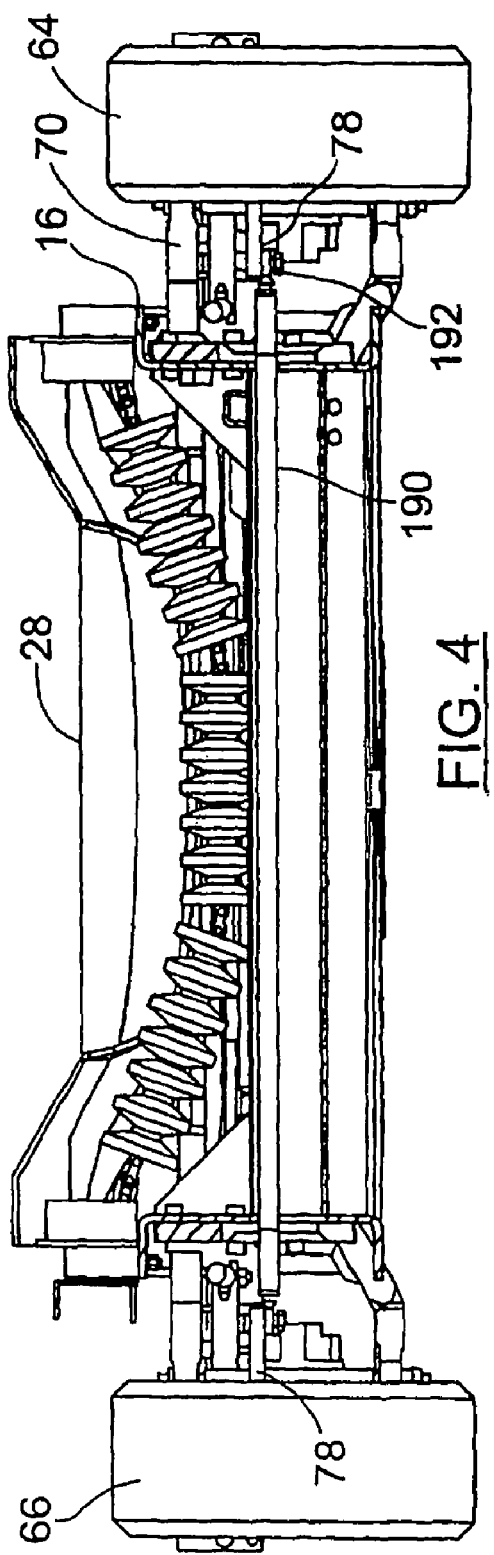

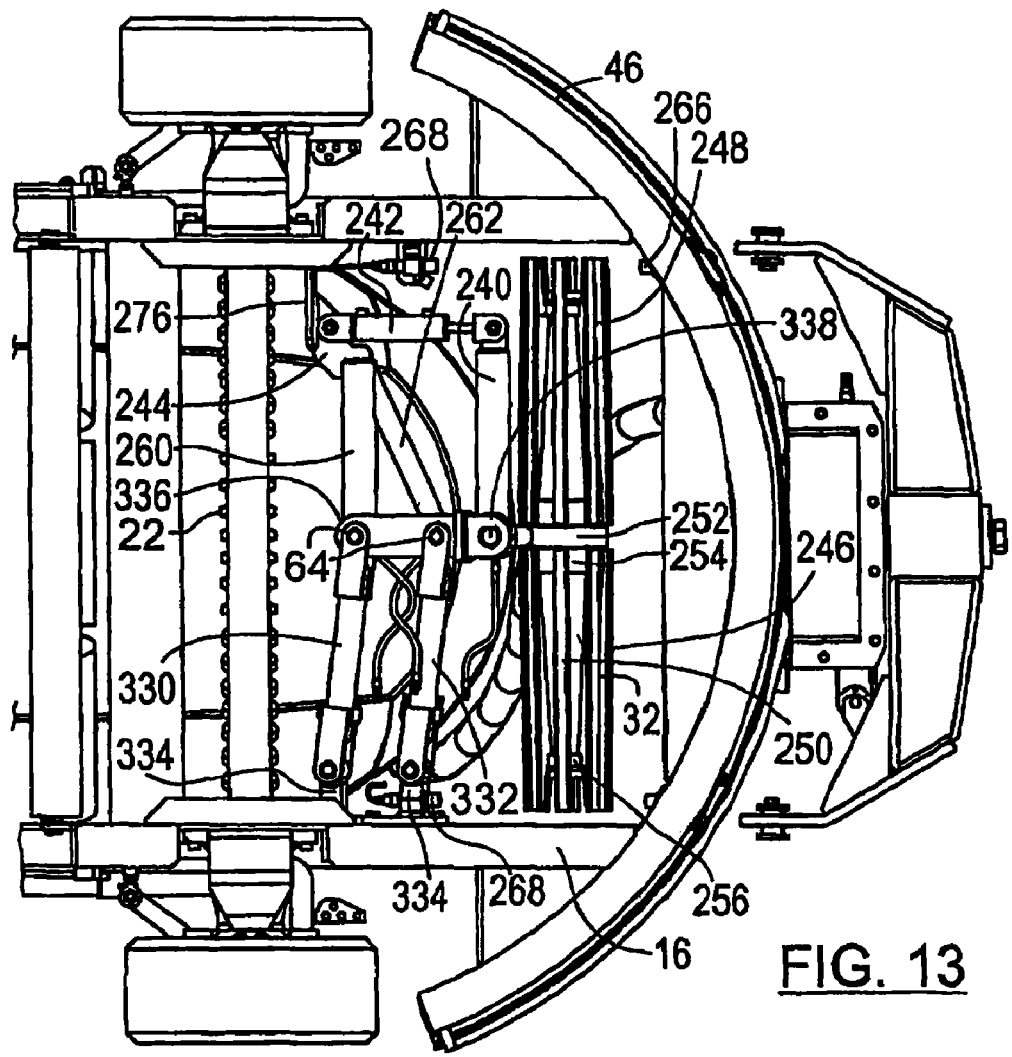
FIG. 13
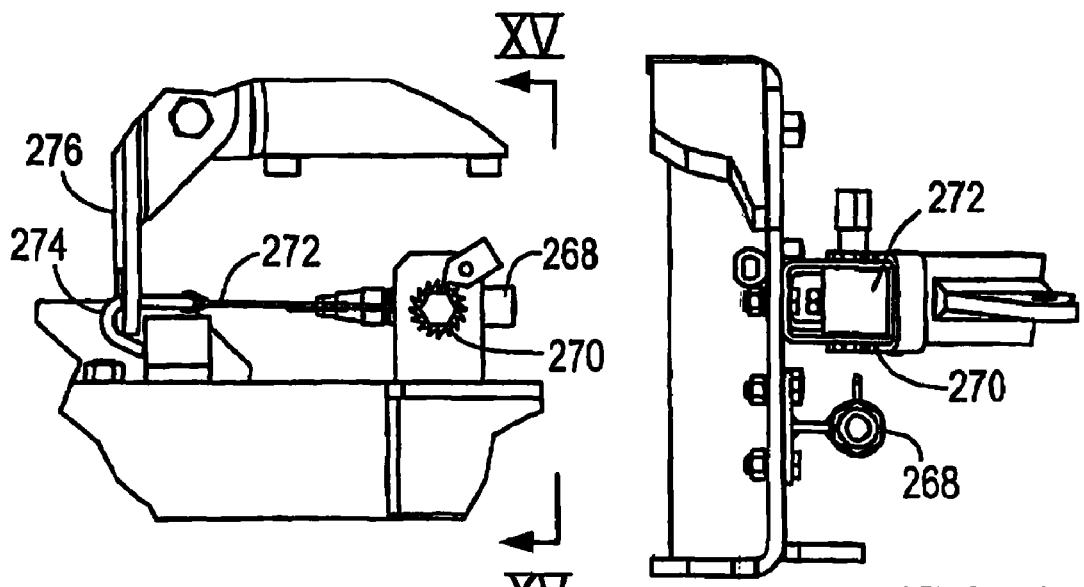
FIG. 14
FIG. 15

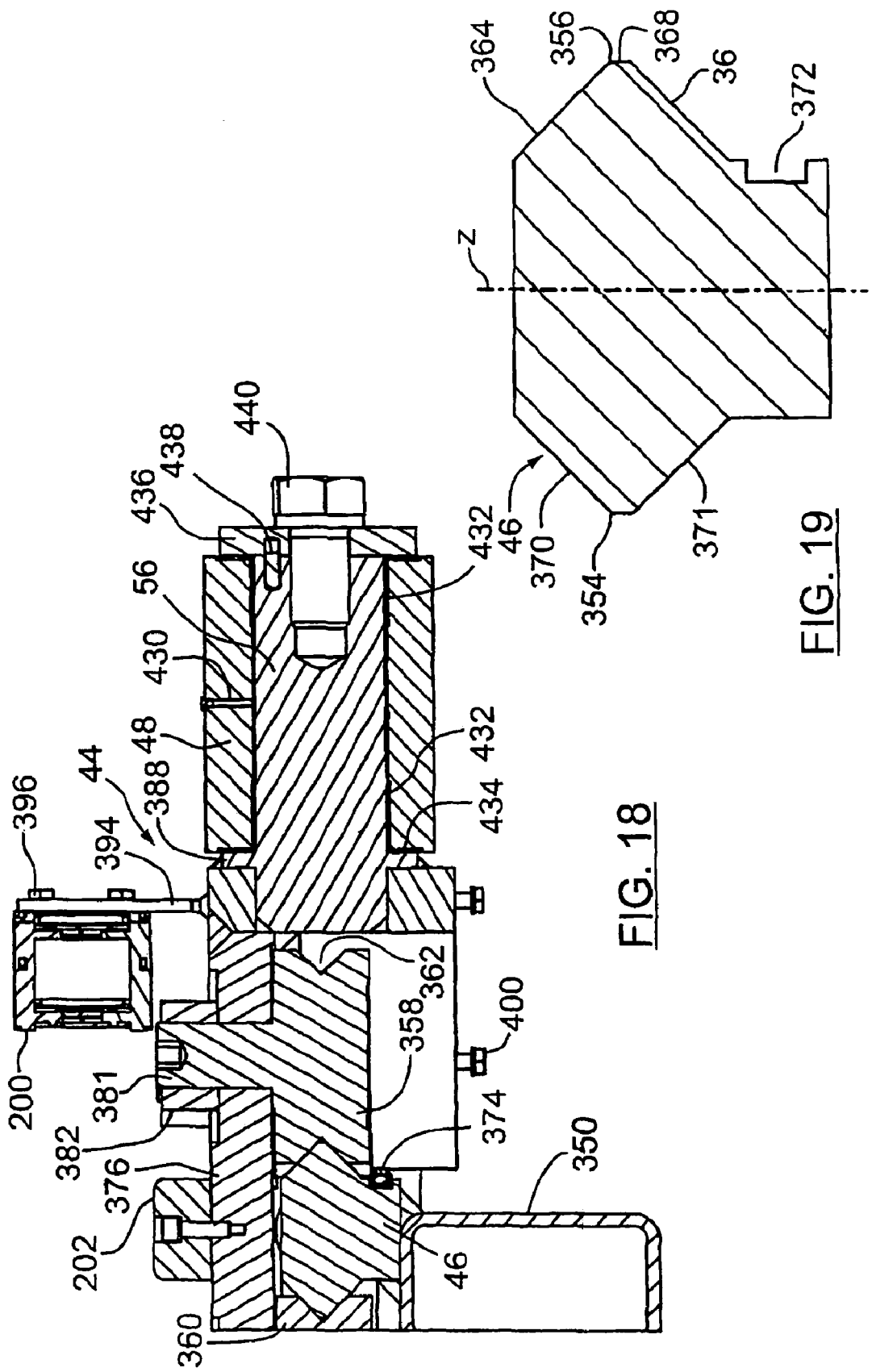

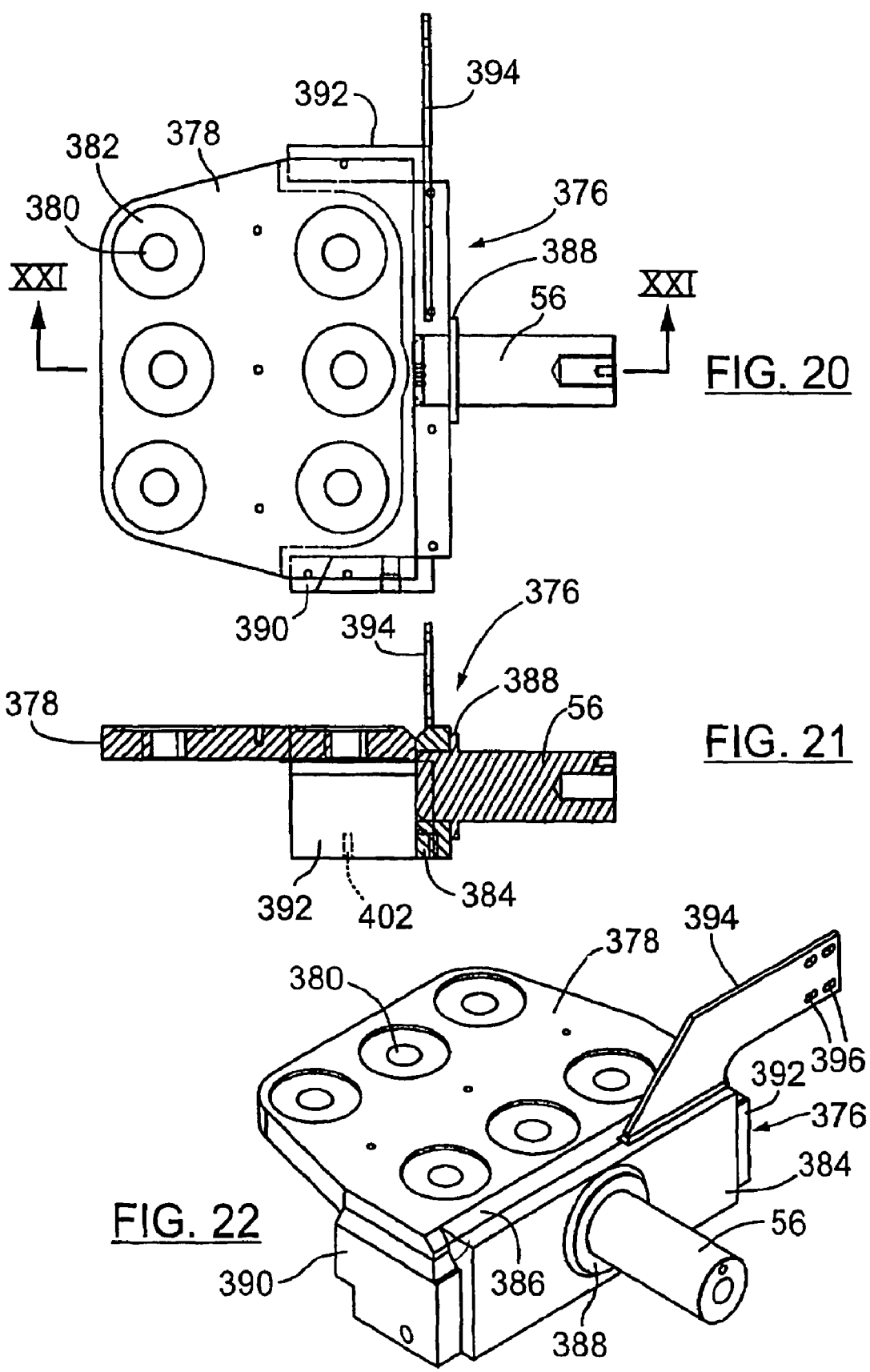

BELT TYPE CONVEYOR APPARATUS WITH ADJUSTABLE TAIL PULLEY

This application is a continuation of International application Ser. No. PCT/CA2008/00045 filed on Feb. 7, 2008, and claims priority of Canadian Patent Application Ser. No. 2,578,427 filed on Feb. 8, 2007.

This invention relates to conveyor apparatus and systems and, in particular, a conveyor machine for use with a continuous conveyor belt equipped with a tail pulley about which the belt can extend and reverse direction.

Belt conveyors are well known and are efficient means for moving large quantities of materials such as ore, coal and granular stone over a predetermined distance extending either horizontally, vertically or both. One form of conveyor system known for mining applications is a system involving a series of conveyors mounted on wheels so as to make the system easily movable. Because of the manner in which mines are developed and extended, it may be necessary for a relatively long conveyor system to be moved along a substantially curved or zig zag course. Under such circumstances, it can be difficult and time consuming to move the conveyor system when required. It will also be appreciated that it may be necessary to move the conveyor system and to make adjustments to the system fairly frequently as the mining machine advances in a mine.

U.S. Pat. No. 5,366,059 issued Nov. 22, 1994 to Prairie Machine & Parts Mfg. Ltd. describes and illustrates a conveyor system comprising a plurality of conveyor vehicles connected together in the form of a train and also describes a steering system for steering this train of vehicles. All but one of the vehicles in the train has a single pair of steerable wheels with the vehicle at the outby end of the train (that is the end to which the mine material is being delivered) having two steerable wheels. Hydraulic cylinders are used to steer each of the pairs of steerable wheels and there is a control mechanism for controlling and coordinating these cylinders in order to set the steering angles of the pairs of wheels. In this known system, each pair of wheels is mounted on an axle and each pair is driven by an electric tram motor mounted along the longitudinal centre of the conveyor vehicle. One difficulty encountered with this known conveyor system is that the system is relatively high along most of the length of the train and therefore the ceiling of the region of the mine where the mining machine is operating must be reasonably high, for example over six feet, to accommodate this conveyor system.

There is a need for a belt direction reversing tail pulley mechanism which is mounted on a pulley support member that can be pivoted about a generally vertically extending pivot axis and an interconnecting support arrangement for this pulley support member that includes a pivot connector for the pulley support member that enables the latter to pivot about the aforementioned axis. By providing a mechanism for pivoting the pulley support member about the pivot axis, there can be provided a means to maintain the conveyor belt within a desired central region of the tail pulley during use of the conveyor. In particular, there is a need to provide a new tail pulley mechanism and mounting therefor of the aforementioned type which can be used in a conveyor apparatus having a low profile.

In addition, there is a need to provide an improved controller for controlling an actuator capable of pivoting the pulley support member about the pivot axis to maintain the conveyor belt within a desired central region of the tail pulley. The aforementioned controller is desirably an electronic controller such as a programmable logic controller which is connected to light beam sensors which sense a shift of the conveyor belt out of the desired central region and from which the controller is able to determine when the belt requires recentering.

There is an additional need in a conveyor that uses an endless conveyor belt to provide a support arrangement for mounting one of the two pulleys of the conveyor wherein an actuator is provided for pivoting a pulley support member on which the one pulley is rotatably mounted to maintain the belt in substantially center running alignment during use of the conveyor. In an exemplary embodiment, there is an additional mechanism provided for adjusting the position of the support arrangement relative to the support frame of the conveyor in order to increase or decrease the overall tension in the conveyor belt.

One exemplary form of the aforementioned movable support arrangement for a pulley is particularly suitable for a mobile conveyor having a low profile, for example, less than five feet and preferably no more than four feet.

According to one aspect of the invention, a conveyor apparatus for use with a continuous flexible conveyor belt includes an elongate conveyor support frame having opposite longitudinal sides extending between two frame ends. A plurality of conveyor belt supporting devices are mounted on and distributed along the support frame for rotatably supporting the conveyor belt. These supporting devices include a belt direction reversing tail pulley mechanism having two tail pulley sections mounted on a pulley support member for rotation about a common central axis of rotation extending generally transversely relative to the longitudinal sides of the frame. The tail pulley sections have adjacent inner ends and the pulley support member includes a central support portion located at these inner ends and extending radially outwardly from these inner ends relative to the axis of rotation to a generally vertically extending pivot axis. The apparatus further includes an interconnecting support device or mechanism for mounting the pulley support member on the conveyor support frame, this device or mechanism including a pivot connector connecting the central support portion to the interconnecting support mechanism for pivotable movement about the pivot axis. There is also provided a pivot device or mechanism for pivoting the pulley support member about the pivot axis to maintain the conveyor belt within a desired central region of the tail pulley formed by the tail pulley sections during use of the conveyor apparatus.

In an exemplary embodiment of the conveyor apparatus, the pivot mechanism includes a belt control arm fixedly connected to the central support portion for pivotable movement therewith and a hydraulic linear actuator having an actuator rod pivotably connected to the control arm.

According to another aspect of the invention, a conveyor apparatus for use with an endless, flexible conveyor belt for conveying mine material includes an elongate conveyor support frame having opposite longitudinal sides extending between two frame ends and a plurality of conveyor belt supporting devices mounted on and distributed along the support frame for rotatably supporting the conveyor belt. These supporting devices include a belt direction reversing tail pulley mechanism mounted on a pulley support member for rotation about a central axis of rotation extending generally transversely relative to the longitudinal sides. There is also provided a support device or mechanism for mounting the pulley support member on the conveyor support frame. The pulley support member is mounted on the support device or mechanism for pivotable movement about a generally vertically extending pivot axis provided by said support mechanism and located centrally between the longitudinal sides of the support frame. An actuator is provided in order to pivot the pulley support member and its tail pulley mechanism about the pivot axis to maintain the conveyor belt within a desired central region of the tail pulley mechanism during use of the conveyor apparatus. An electronic controller is provided to control operation of the actuator. There is also a light beam sensor arrangement for sensing a shift of the conveyor belt out of the desired central region and for indicating this shift to the controller. When a light beam of the sensor arrangement is blocked by the conveyor belt during use of the conveyor apparatus, the controller causes the actuator to pivot the pulley support member in a direction which tends to increase tension in the conveyor belt on the longitudinal side thereof where the light beam is blocked.

In an exemplary version of this conveyor apparatus, the sensor arrangement includes two photoemitters and two photoreceivers with each photoemitter and its aligned photoreceiver being located adjacent a respective one of two outer end sections of the tail pulley mechanism.

According to a further aspect of the invention, there is provided a conveyor apparatus for use with an endless conveyor belt which extends about two belt direction reversing pulley devices and is operable under tension. This apparatus includes a conveyor support frame and a non-rotating pulley support member on which one of the two pulley devices is mounted for rotation about an axis of rotation. There is further provided a movable support device or mechanism for mounting the pulley support member on the conveyor support frame. The pulley support member is mounted on the support device or mechanism for pivotable movement about a substantially vertically extending pivot axis. An actuator is provided for pivoting the pulley support member and its pulley device about the pivot axis to maintain the conveyor belt in substantially centered running alignment with the one pulley device during use of the conveyor apparatus. Furthermore, there is an adjusting mechanism for adjusting the position of a portion of the support mechanism relative to the support frame in order to increase or decrease the overall tension in the conveyor belt. This adjusting mechanism is capable of moving the pulley support member and its pulley device away from the other pulley device to increase the tension.

In an exemplary embodiment of the aforementioned conveyor apparatus, the movable support device or mechanism includes two parallel, spaced-apart link members pivotably mounted on the conveyor support frame and having inner ends located near or at a longitudinal centerline of the support frame which is elongate and substantially rectangular in plan view. There is also a central mounting frame member pivotably connected to the inner ends of the link members and the pulley support member is pivotably connected to the central mounting frame member.

These and other aspects of the disclosed conveyor apparatus and adjustable tail pulley will become more readily apparent to those having ordinary skill in the art from the following detail description taken in conjunction with the accompanying drawings.

In the drawings,

FIG. 1 is a top view of an exemplary embodiment of a conveyor apparatus constructed in accordance with the invention;

FIG. 2 is a side elevation of the conveyor apparatus of FIG. 1;

FIG. 3 is a bottom view of the conveyor apparatus of FIGS. 1 and 2;

FIG. 4 is a sectional elevation taken along the line IV-IV of FIG. 2;

FIG. 13 is a partial bottom view of the conveyor machine showing the end where the tail pulley is mounted;

FIG. 14 is a detail view of the circled area marked E in FIG. 1;

FIG. 15 is another detail view taken along the line XV-XV of FIG. 14;

FIG. 18 is a vertical cross-section taken along the line XVIII-XVIII of FIG. 16 illustrating how the rollers engage the track;

FIG. 19 is a detail view showing the transverse cross-section of the curved track according to an exemplary embodiment;

FIG. 20 is a top view of a roller mounting support body which is part of the hitch unit;

FIG. 21 is a vertical cross-section of the roller mounting support body taken along the line XXI-XXI of FIG. 20;

FIG. 22 is a perspective view of the roller mounting support body of FIG. 20 taken from above and from its pivot pin end;

Figure 5:
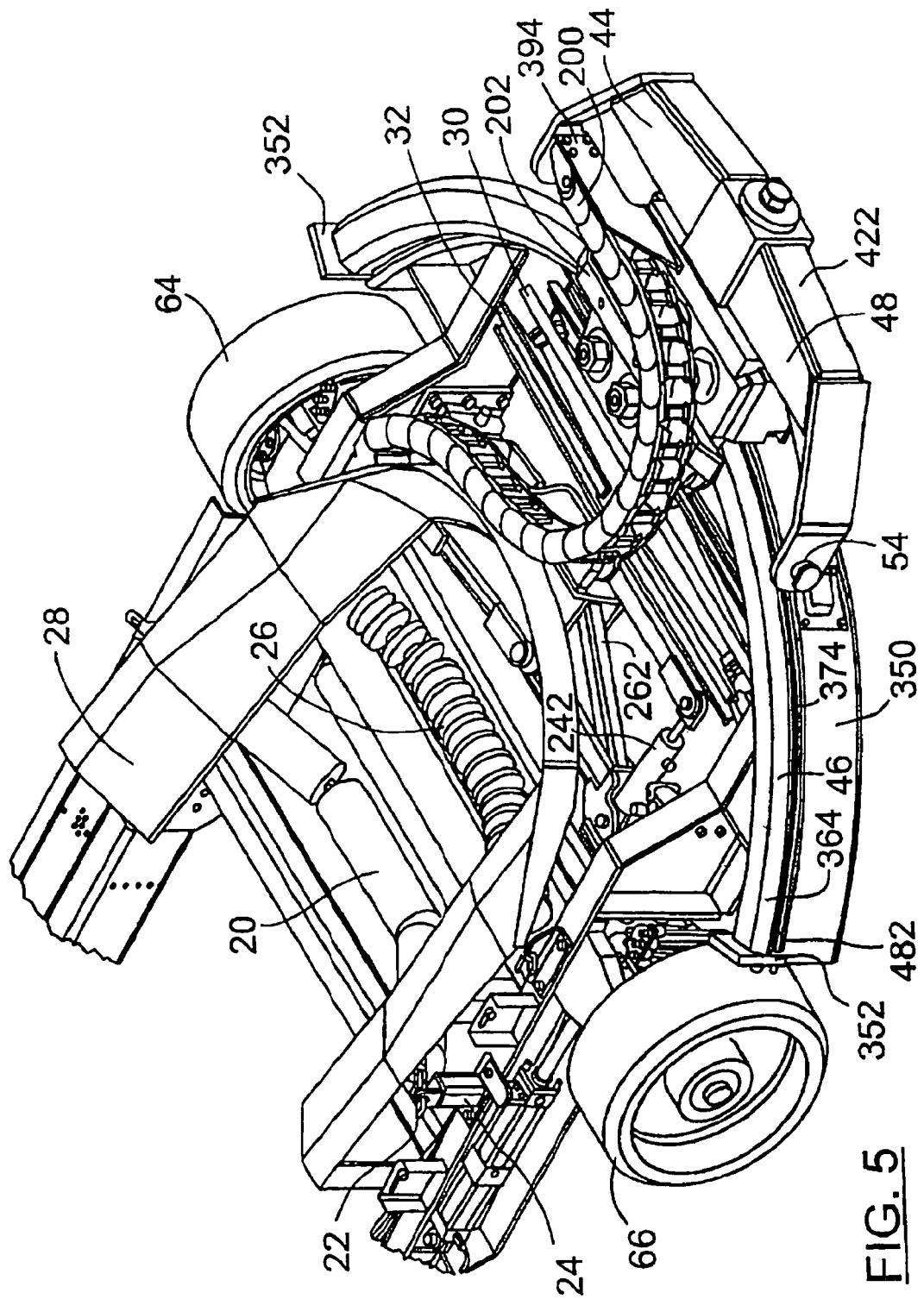
FIG. 5 is a perspective view taken from above and from the tail pulley end of the conveyor machine, this view showing an end section of the machine including its two wheels.

A conveyor apparatus constructed in accordance with the invention is illustrated in FIGS. 1 to 5 of the drawings. The illustrated, low profile conveyor vehicle 10 has been shown without the usual flexible conveyor belt, the location of which is only indicated in chain-link lines in FIG. 1 for sake of illustration. This conveyor belt 12 is an endless conveyor belt and can be of standard construction depending upon the type of material being conveyed by the conveyor system. The illustrated exemplary conveyor apparatus is a vehicle intended for use as an intermediate conveyor car of which there may be five, ten or more in a train of conveyor vehicles similar to the train illustrated and described in U.S. Pat. No. 5,366,059. It will be understood that in addition to a plurality of intermediate conveyor vehicles pivotably connected end-to-end, there can also be a loading conveyor vehicle which is located at the end of the train adjacent the mining machine, and a discharge conveyor vehicle located at the opposite end of the train which is referred to as the outby end, that is, the end to which the train of vehicles delivers the material. The loading car assembly can be constructed in a similar manner to the illustrated intermediate car assembly 10, except that it need not be provided with a hitch mechanism at its inby or hopper end, since there is no need to attach this end to another conveyor vehicle. As for the discharge conveyor vehicle, it is provided with two pairs of transversely aligned wheel units rather than a single pair of these wheel units described hereinafter. However, the wheel units on the discharge car can be constructed in the same manner as described hereinafter, including their steering mechanism and their hydraulic drive mechanism. The discharge car is also provided with a pivotable cross-conveyor for discharging the material onto a permanent or fixed conveyor in the mine. A cross-conveyor and its use is described and illustrated in U.S. Pat. No. 5,366,059. A detailed description of the discharge car and its cross-conveyor herein is deemed unnecessary as a cross-conveyor system is not considered an aspect of the invention claimed herein.

Turning now to the illustrated conveyor apparatus 10, this apparatus has a conveyor mechanism 14 that includes an elongate, substantially horizontal frame 16 and a plurality of conveyor belt supporting devices which as illustrated include spaced apart conveyor roller devices 18 mounted on the horizontal frame 16 and adapted to support rotatably an upper run of the continuous conveyor belt 12 extending between opposite end sections of the vehicle. The roller devices 18 can be of standard construction available from conveyor parts suppliers. Each illustrated roller device comprises three metal rollers 20 which are pivotably connected together in an end-to-end fashion by their central shafts. The outer end of each outer roller is connected by a chain 22 (see FIG. 5) to a vertical support post 24 mounted on a main, longitudinally extending frame member of the main frame 16. The height of each pair of posts 24 varies as shown to gradually increase the height of the roller devices. In addition to the cylindrical, rotatable metal rollers 20, there can also be provided impact rollers 26 of known construction positioned below a U-shaped hopper member 28. It will be understood that the impact roller helps to absorb the impact of material dropping onto the conveyor belt at this location.

The belt supporting devices include a belt direction reversing tail pulley mechanism mounted adjacent one end of the conveyor mechanism on the horizontal frame 16 and having a rotatable tail pulley indicated at 32. Further details of the construction of the tail pulley unit are provided hereinafter with reference to FIGS. 5, 13 to 15, and 26 to 33. The conveyor mechanism 14 further includes a head pulley unit 34 mounted adjacent the second end of the conveyor mechanism opposite the first end where the tail pulley is located. The head pulley unit includes a rotatable head pulley 36 which, in a known manner, can be provided with a gripping cylindrical surface which enables the head pulley unit to drive the conveyor belt 12. There is also an electric motor mechanism 38 which can be considered part of the head pulley unit since it rotates the head pulley 36 to move the conveyor belt and thus to transport material from the tail pulley to the head pulley. A belt scraper 40 of known construction can be mounted adjacent to the head pulley to help keep the conveying surface of the belt clean. Mounted adjacent to the head pulley at the outby end of the vehicle is a material hopper 42 which helps direct the material onto the conveyor belt of the next conveyor vehicle of the train. There can be provided a pivoting hitch mechanism 44 at the inby end of the vehicle. This hitch mechanism can include a curved steel track and a rolling hitch device 48 having two sets of grooved rollers located at 50 and 52 on two opposite V-shaped sides of the track 46. Two car hitch pins 54 are located on opposite sides of the hitch device 48 which is able to pivot about a central longitudinal axis of the vehicle by mean of central pivot pin 56 (see FIG. 18). Located near the opposite head pulley end of the car are two hitch pin holders 60, one on each side of the frame 16.

Figure 7:
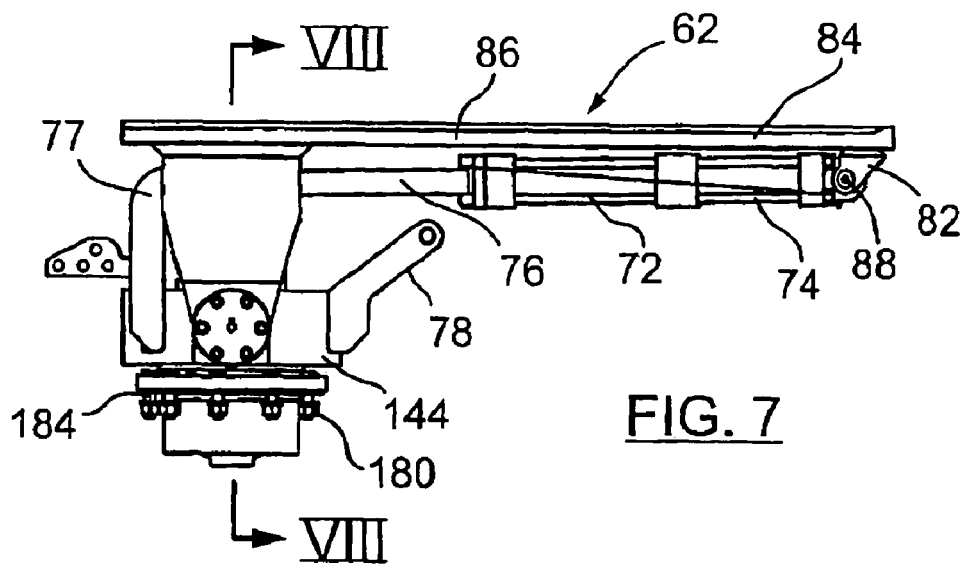
FIG. 7 is a detail top view of a left hand wheel unit assembly of the vehicle of FIGS. 1 and 2, this view omitting the wheel itself for sake of illustration.

The conveyor vehicle 10 has a pair of transversely aligned wheel units indicated generally at 62 for supporting and moving the conveyor vehicle. Each of these wheel units is separately connected to the horizontal frame 16. In particular, each wheel unit is connected to a respective longitudinally extending side of the frame. Each wheel unit has its own solid wheel with the wheel on the left side indicated at 64 and the wheel on the right hand side indicated at 66. As explained more fully hereinafter, each wheel 64, 66 is mounted for pivotable movement about a substantially vertical pivot axis for steering purposes, that is, to steer the vehicle 10. In an exemplary embodiment of the conveyor vehicle, each wheel unit includes a standard hydraulic motor 68 shown clearly in FIG. 8. This motor is used to rotate or drive the wheel of the respective wheel unit. Also, each wheel unit includes a non-rotating wheel support structure indicated generally at 70 for detachably connecting the wheel unit to the horizontal frame. The left hand wheel unit 62, with its wheel removed, is illustrated in FIG. 7 and is illustrated with its wheel in FIGS. 8 and 9. FIG. 7 also shows a power steering mechanism or power steering means 72 for steering the wheel of this wheel unit. The illustrated power steering mechanism includes a hydraulic linear actuator having a hydraulic cylinder 74 and an actuator rod 76 slidable in the cylinder. A steering arm 77 having a L-shape is rigidly attached at one end to an upper section of a motor support member 144 (see FIG. 12) and is pivotably connected at its other end to the rod 76 by means of a bolt and nut 80 (see FIG. 9). The closed end of cylinder 74 is pivotably mounted by means of lugs 82 to an end of a horizontally extending, elongate arm section 84 which is part of a wheel unit mounting plate 86. A nut and bolt combination 88 pivotably connects a short connecting plate 90 that is rigidly attached to the end of the cylinder to the lugs 82. The actuator rod 76 can be provided with a spherical bearing 92 that is connected by threads to the outer end of the rod. This bearing is connected to the steering arm 77 by the nut and bolt 80.

Figure 6:
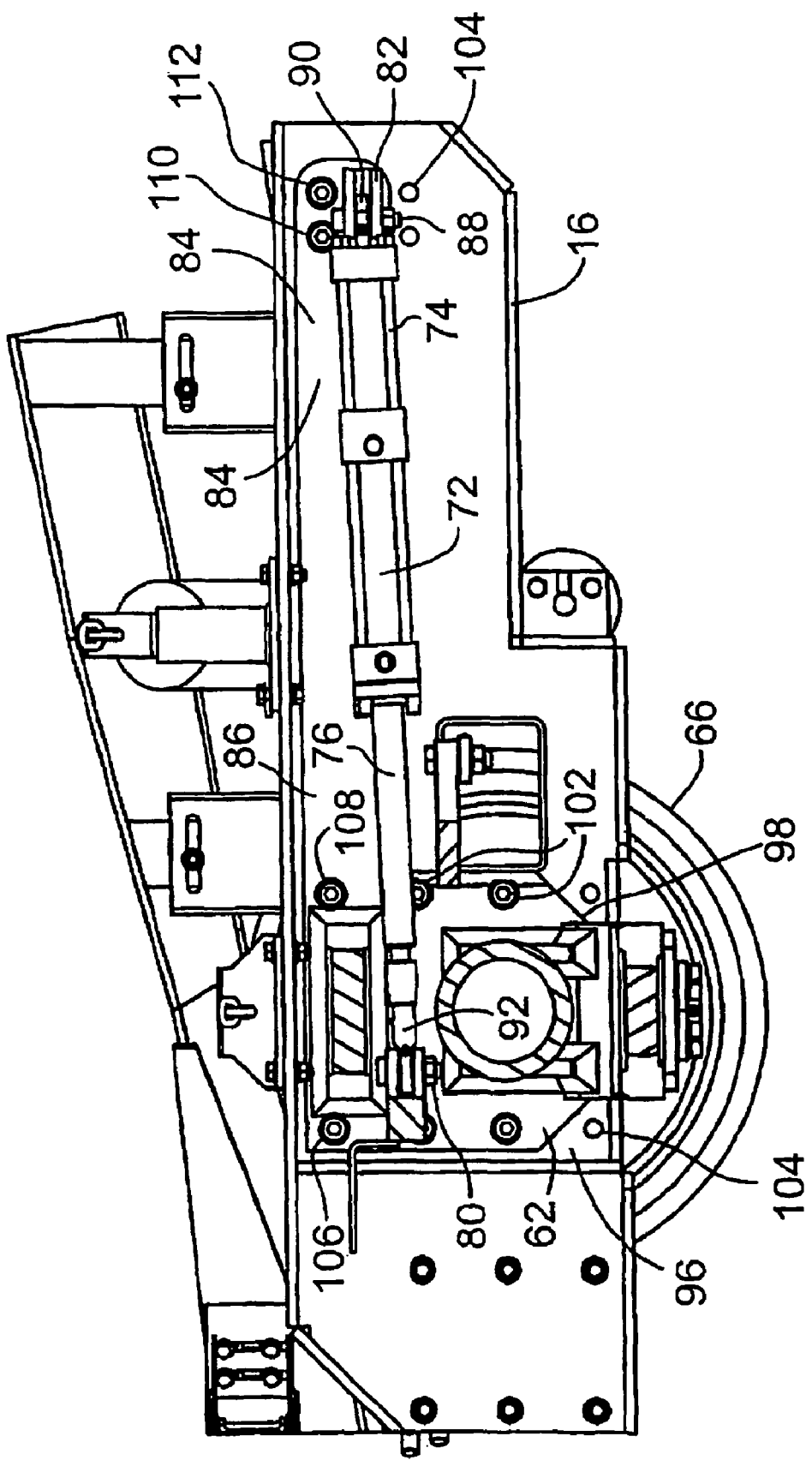
FIG. 6 is a sectional elevation taken along the line VI-VI of FIG. 1, this view showing details of the power steering arrangement for each wheel.

In addition to the arm section 84, the flat mounting plate 86 includes a main plate portion 96 shown in FIG. 6. This main plate portion has a generally rectangular shape except for cut-off bottom corners 98. The arm section 84 extends horizontally from an upper corner of the main plate portion 96. An advantage provided by the arm section 84 is that the hydraulic cylinder can then be pivotably mounted to the same mounting plate 86 as the wheel and its hydraulic motor 68. As can be seen from FIGS. 6 and 11, each wheel unit 62 and, in particular its mounting plate 86 (which is part of the wheel support structure), is formed with a plurality of apertures or holes indicated generally by reference 100 which are provided to receive fasteners, preferably bolts, used to attach the respective wheel unit to the frame 16. A plurality of fasteners 102 for this purpose are insertable through spaced-apart apertures 104, four of which can be seen in FIG. 6. There are a plurality of the apertures 104 formed in each longitudinally extending side of the frame 16 and optionally additional apertures can be provided in extension plates attachable to the main frame members. The apertures 100 formed in the mounting plate 86 are located in opposite end sections of the mounting plate as clearly shown in FIG. 11. The illustrated aperture arrangement permits the height of each wheel unit relative to the horizontal frame 16 to be adjusted between either one of two possible positions, but it will be appreciated by those skilled in the art that by providing further apertures 104, for example, on each longitudinal frame member or an extension plate, it is possible to provide for more than two possible height positions for each wheel unit. In the position of the wheel unit illustrated in FIG. 6, the wheel unit 62 is at its maximum height relative to the frame 16. In this position, the overall height of the conveyer vehicle will be a minimum height which, in an exemplary embodiment, is only four feet or forty-eight inches as compared to earlier conveyer vehicles such as those described and illustrated in U.S. Pat. No. 5,366,059 which had an overall height of six feet or seventy-two inches. In this position of the wheel units in the exemplary embodiment, the ground clearance provided under the vehicle is six inches.

Figure 8:
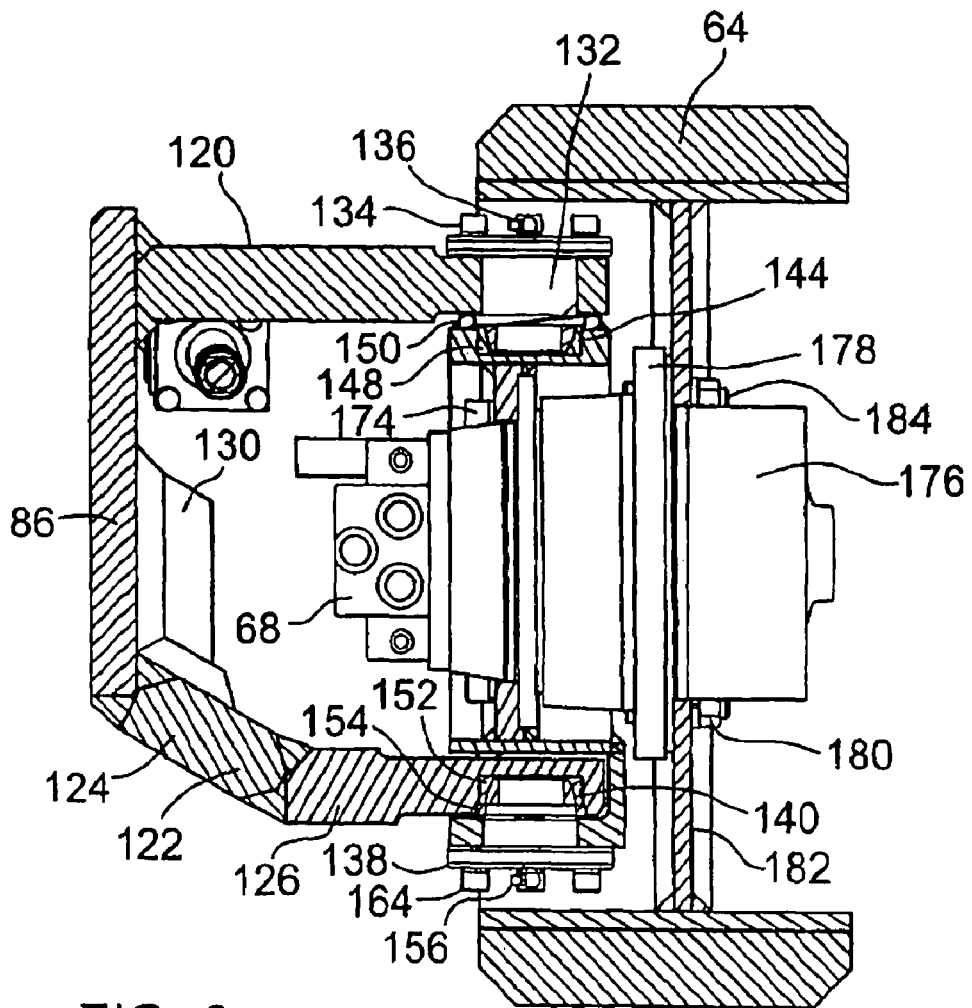
FIG. 8 is a detail sectional elevation taken along the line VIII-VIII of FIG. 7.
Figure 9:
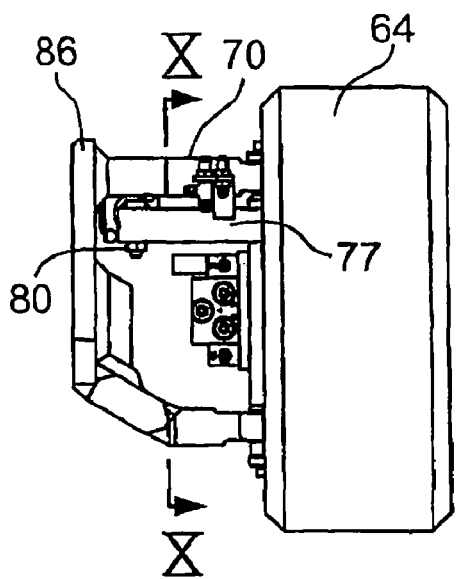
FIG. 9 is a detail end view of the wheel unit assembly of FIG. 7, this view being taken from the left side of FIG. 7 and showing the wheel mounted on the assembly.
Figure 11:
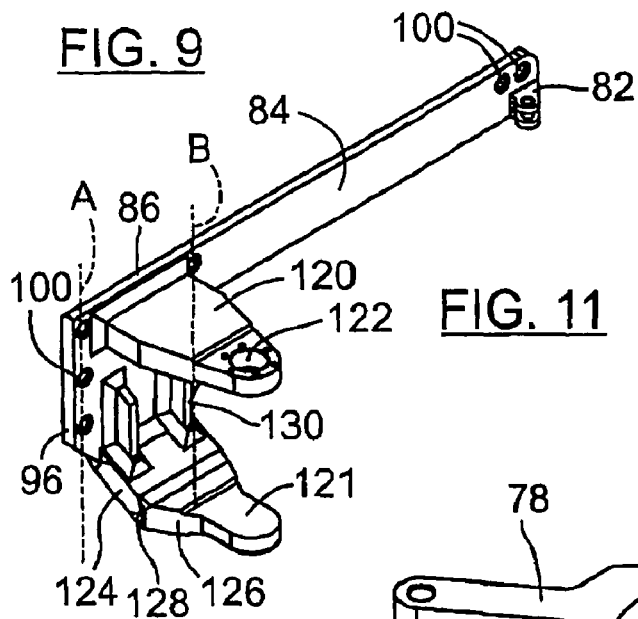
FIG. 11 is a perspective detail view of a mounting plate weldment used to support each wheel and its hydraulic motor.

Turning now to the wheel support structure 70, shown in FIGS. 8 and 11, the wheel support structure includes upper and lower, horizontally extending wheel supporting arms 120, 122, both with rounded distal ends. The upper arm 120 can be formed from a single steel plate welded to the top of mounting plate 86 and is formed with a round hole 122 to receive an upper pivot pin member. As illustrated, the lower support arm 122 can be constructed of two short plate members 124, 126 which are welded together at 128 and which extend at an obtuse angle to one another as shown in FIG. 8. The strength and rigidity of the connection between the sloping plate 124 and plate 86 can be strengthened by two vertically extending gussets 130 which are welded to these plates. A top pivot pin 132 is mounted in the hole 122 and is connected to the upper arm 120 by six screws 134. The pivot pin can be provided with a central passageway (not shown) that extends downwardly from grease zerk 136. There is also a bottom pivot pin 138 having a reduced top end extending into a circular recess 140 formed in the rounded end section of the lower support arm 122.

Figure 12:
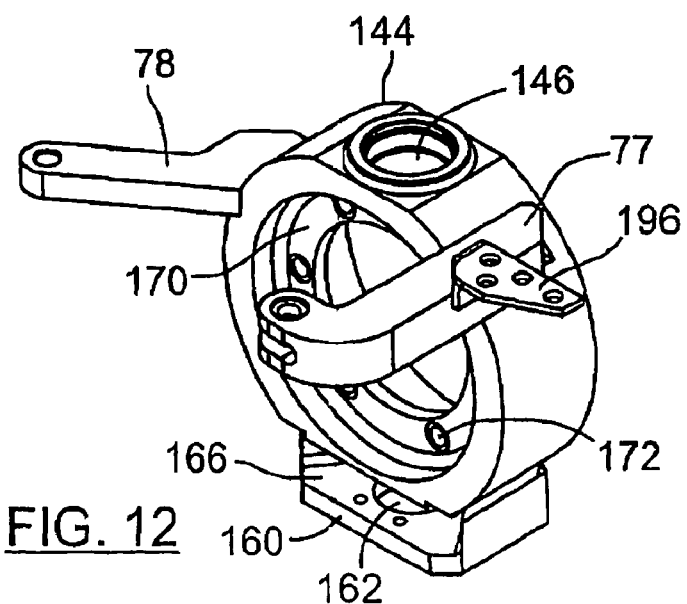
FIG. 12 is a detail perspective view illustrating a pivotable motor support member mounted adjacent each wheel.

In order to pivotably support the wheel and its hydraulic motor 68, there is provided a substantially annular motor support member 144 shown in FIG. 12. This support member has a circular recess 146 formed on its top side and into this recess a reduced bottom end section of the top pivot pin 132 extends. Mounted in this recess is a spherical angular contact bearing 148 which, in one embodiment, has a bore measuring 1¾" and has an outside diameter of 2¹³⁄₁₆ inch. Protecting this bearing and extending around the top edge of the bearing is a suitable seal such as a Chesterton Super Wiper seal 150. Similarly, extending around a reduced upper portion of the bottom pivot pin is a spherical angular contact bearing 152 which is sealed by means of a Chesterton super wiper seal 154. The bottom pivot pin can be greased through grease zerk 156.

Returning to FIG. 12, it will be seen that the motor support member 144 has a bottom extension 160 which is welded to the annular portion of the support member 144 and which has a circular hole 162. The bottom pivot pin projects through the hole 162 from the bottom and is detachably connected to the extension 160 by six screws 164 which extend through a flange extending around the bottom of this pivot pin. Formed between the extension 160 and the annular portion of support member 144 is a cavity 166 which receives the rounded end portion of the horizontal plate 126. In this way, the support member 144 is pivotably supported from below.

Figure 10:
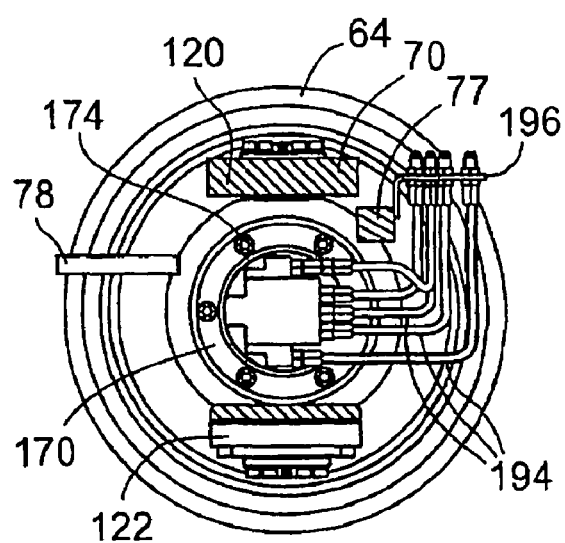
FIG. 10 is a detail sectional elevation taken along the line X-X of FIG. 9.

It can also be seen from FIG. 12 that the support member 144 has a radially inwardly extending connecting flange 170, this flange being formed with a series of fastener holes 172. As shown in FIG. 10, six screws 174 can be used to attach the hydraulic motor 68 to the flange 170 along with its associated planetary gear box 176. The planetary gear box has an annular rotating flange 178 which is attached by nine hex nuts 180 to a circular plate 182 forming a central portion of the hub of the wheel. The nuts are threaded onto studs 184 visible in FIG. 7, these studs extending through the rotating flange on the gear box. It is understood that the left and right wheels 64, 66 are solid rubber wheels and, in one embodiment, each wheel measures 10"×24" in diameter. The left and right wheels 64, 66 are connected by a steering tie rod 190 shown in FIG. 4 which ensures that the wheels pivot in the same way at the same time. It is connected at each end to the tie rod arm 78 of the respective wheel by means of a bolt with a nylon insert lock nut 192.

It will be understood that the hydraulic motor for each wheel unit is provided with pressurized hydraulic fluid through hydraulic lines and fittings of standard construction which are readily available and well known in the art. Most of these lines are not shown for ease of illustration. Some of these lines are indicated at 194 in FIG. 10. Connecting fittings for these lines can be supported by a small bracket 196 shown in FIG. 12. It will be understood that the hydraulic motor itself and its gear box are of standard construction and accordingly a detailed description herein is deemed unnecessary.

Various other features in the illustrated exemplary low profile conveyer vehicle that are shown in FIGS. 1 to 3 include a plastic energy chain 200 through which electrical cables and wires are fed for the operation of the vehicle and an energy chain guide 202 which helps to support the movement of the energy chain. Mounted to the frame on the left side is an electrical power box 204 of standard construction, this box having an access door 206. Mounted to the same side of the frame is an electric motor 208 which powers first and second hydraulic pumps 210 and 212, the first pump 210 being used to drive the hydraulic motors for the wheels and the second motor 212 being used to power other hydraulic components on the vehicle. Two standard filters for the hydraulic system are provided at 214 on the right side of the vehicle. Mounted above these filters is a junction box 116. A third hydraulic filter can be provided at 218 adjacent the pump 212. On or between the two longitudinal main frames of the frame 16 and adjacent one of the cross-frames 220 is a hydraulic fluid reservoir 222. Another junction box for electrical components including connectors is provided on the right side at 224. The side mounted electrical motor 38 for the head pulley is connected to a conveyor gear box 226 which has an output shaft connected to the shaft of the head pulley. In one embodiment, the motor 38 is a 7.5 kwatt or 10 hp motor. Also on the right side of the vehicle there is mounted to the longitudinal frame member a hydraulic assembly manifold 230 which is protected by a shroud or guard 232. On the other side of the frame near the motor 38 is a control box containing a programmable logic controller for controlling the operation and steering of the vehicle, the box indicated at 234. In a known manner, the vehicle 10 can also be provided with water sprayers, two of which are indicated at 241, 243. Water hoses (not shown) are connected to the sprayers to reduce dust levels generated by the conveyor system.

Figure 16:
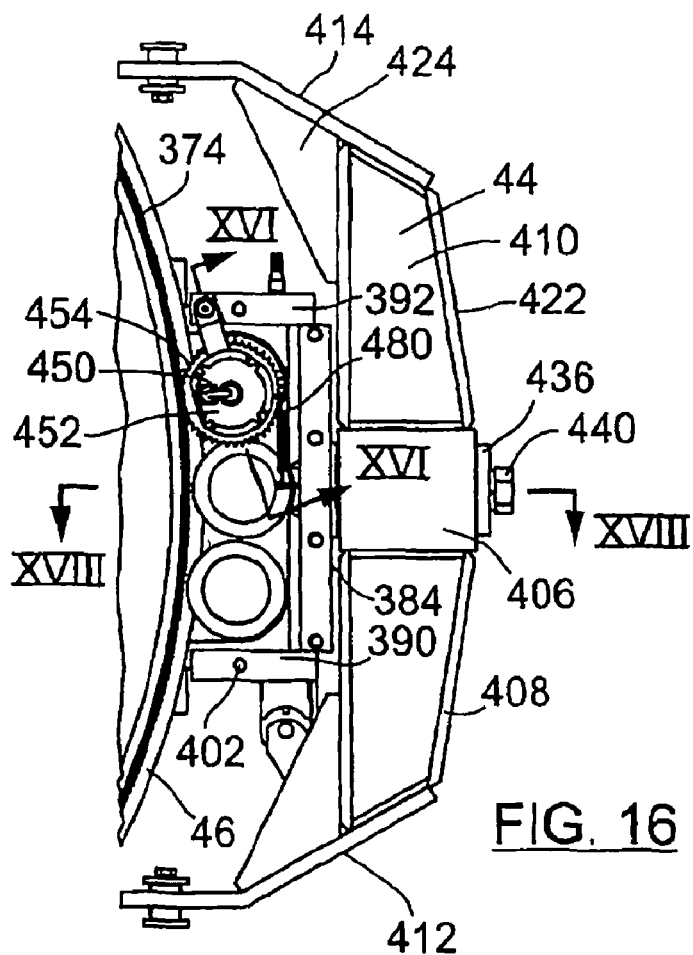
FIG. 16 is a bottom view showing a portion of the curved track and the hitch unit mounted for rolling movement on the track.
Figure 17:
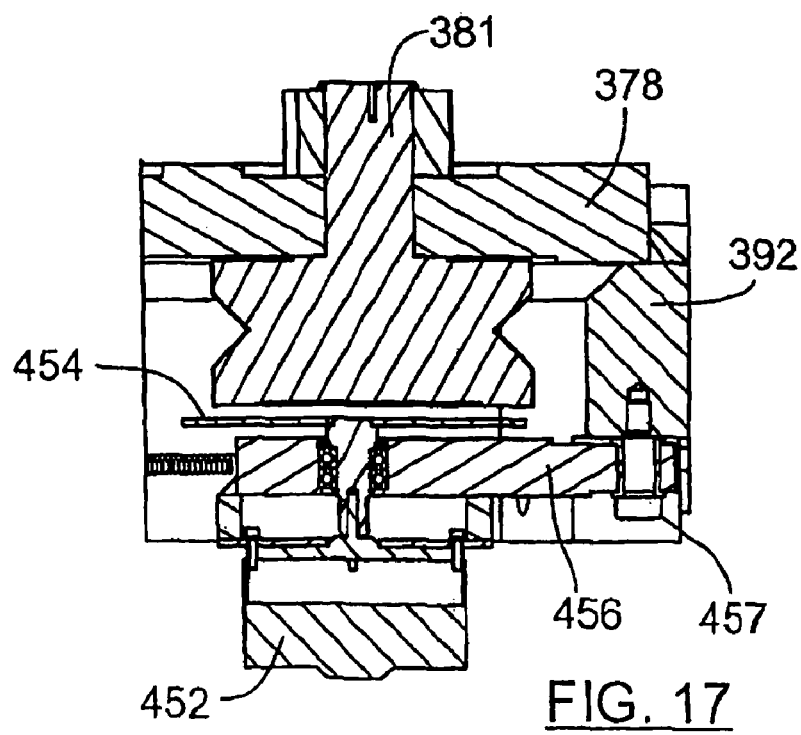
FIG. 17 is a vertical cross-sectional detail taken along the line XVIi-XViI of FIG. 16.

FIGS. 13 and 16 illustrate the pivot mechanism or pivoting hitch mechanism 44 for pivotably connecting the mobile conveyor machine of FIGS. 1 and 2 at its inby end (also sometimes referred to herein as its first end) to an adjacent end section of another mobile conveyor machine which can be constructed in the same manner as the machine or vehicle of FIGS. 1 and 2. As indicated above, this pivot mechanism includes the curved track 46 which can be of uniform transverse cross-section and, in an exemplary version, has the cross-section illustrated in FIG. 14. The curved track is bent in a horizontal circular arc as clearly shown in FIG. 5, for example, and this arc has a center of curvature located midway between the propelling devices, that is the wheels 64, 66. This center of curvature is indicated at C in FIGS. 3 and 4. The center of curvature is on a common axis of rotation for the two wheels when these two wheels are positioned to move the conveyor mechanism in a straightforwards direction. This axis of rotation is indicated at A in FIG. 3. The track is rigidly mounted on the supporting frame 16 which includes a curved bumper frame 350 having a rectangular transverse cross-section, this frame extending the length of the track. The track, which is preferably made of machined solid steel, can be welded to the bumper frame. Each end of the track can be fitted with a rectangular stop plate 352 secured in place by screws threaded into holes formed in each end of the track. An exemplary form of the track has a cross-section such as that shown in FIG. 19 The track has two opposite roller engaging sides 354, 356, with the side 354 being on the inner side of the track and forming a concave curve and the side 356 being on the outer side and forming a convex curve. Each of these sides in the exemplary illustrated version engages three rollers with one of the rollers engaging the side 356 being shown in cross-section at 358 in FIG. 18 Another roller 360 is shown in part in FIG. 18 and this is one of the three rollers engaging the side 354. The three rollers engaging the side 356 form a first set of rollers and the three rollers engaging the side 354 form a second set of rollers. It will be seen that the track 46 is captured and held between the first and second set of rollers. The rollers of both sets have V-grooves 362 formed about their circumferences. The use of three rollers in each set helps keep the hitch unit correctly oriented on the track at all times.

Turning now to the exemplary cross-section illustrated in FIG. 19, the outer convex side 356 which faces towards an adjacent end of the mobile conveyor machine has an upper sloping surface 364 which extends at a 45° angle to the vertical centerline Z of the track. The outer surface also has a lower sloping surface 366 which extends at a 45° angle to the axis Z and there can be a short vertical surface provided at 368. The inner roller engaging side 354 is similarly shaped with 45° sloping surfaces at 370 and 372. These surfaces can be formed by a standard machining process. Also formed in the track member is a rectangular groove 372 which can extend the length of the track member on the side 356. The purpose of this groove is to accommodate a length of roller chain 374 used in conjunction with an angle sensor described hereinafter.

Turning now to the construction of a roller mounting support body 376 illustrated in FIGS. 20 to 22, this body is used to rotatably support the aforementioned two sets of rollers which engage the track 46. This body includes a horizontally extending support plate 378 which can have a generally trapezoidal shape and is formed with six circular holes 380 which accommodate upwardly extending shafts 381 of the rollers. If desired, a shallow circular recess 382 can be formed around each hole to partially accommodate a nut 382 which is threaded onto the roller shaft by suitable threads (not illustrated). Each roller unit is a standard roller and therefore has not been shown in detail. The short shaft 380 extends into and supports the roller. The support body also has a vertical pivot pin support plate 384 which is fixedly connected to an edge of the roller support plate 378. The two plates can be welded together at 386. The horizontally extending, central pivot pin 56 is mounted in a circular hole formed centrally in the support plate 384. The pin 56 is formed with a circumferential flange 388 near its inner end, this flange resting against the support plate 384. The inner end of the pivot pin can be welded to the plate 384. To strengthen the support body 376 two rectangular side plates can be welded thereto at 390, 392. A support plate 394 can be welded to the top edge of the plate 384 and is shaped to form an obtuse angle. Four fastener holes 396 can be formed in the outer end of this support plate. The arm 394 is used to detachably connect one end of the aforementioned energy chain 200. If desired, a cover plate 395 (see FIG. 3) can be attached to the bottom of the support body 376 by means of screws 400 inserted through the cover plate and threaded into holes 402. It will be understood that each roller is provided with internal bearings of standard construction.

Figure 23:
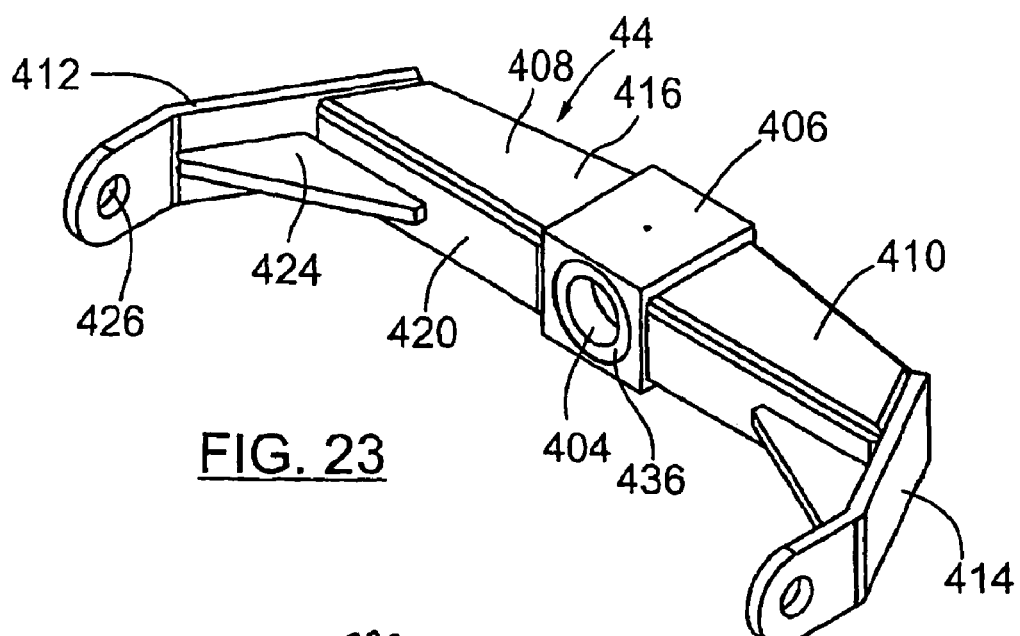
FIG. 23 is perspective view of a pivoting hitch frame which is pivotably connected to the support body of FIG. 20, this hitch frame being shown from above and from an inner side thereof.

Turning now to the construction of the pivoting hitch mechanism or hitch frame 44 illustrated separately in FIG. 23, this frame is pivotably connected to the support body 376 by means of the pivot pin 56. The pivot pin extends into a pin passageway which is formed in a transverse center of the frame. It will be understood that the passageway 404 which has a circular cross-section extends in a radial direction relative to the radius of the track 46. The hitch frame includes a central block 406 in which the passageway is formed, two tubular arm sections 408, 410 and two end sections 412, 414 located on opposite sides of the pivot pin and spaced therefrom, these end sections being adapted for a pivot connection to an adjacent end section of a second or another mobile machine (similar to or the same as the illustrated machine of FIGS. 1 and 2) during use of the hitch apparatus. Each arm section 408, 410 can be formed from a horizontal top plate 416, a similar, horizontal bottom plate 418, an inner rectangular plate 420 and a rectangular, vertical outer plate 422 (see FIG. 5). These plates can be made of ¾ inch steel plate and can be rigidly connected by welding. Each end section 412, 414 can be formed from a bent steel plate forming an obtuse angle as shown in FIG. 23. The plate used can be one inch steel plate and its connection to its arm section can be strengthened by a triangular brace or gusset 424. A circular hole 426 is formed in the rounded end of each end section to receive a respective one of the car hitch pins 56 shown in FIGS. 1, 2 and 5. Thus, the hitch apparatus of this invention can be pivotably connected to an adjacent second mobile machine by means of these hitch pins which permit relative pivotable movement about a horizontal axis between the two mobile machines or mobile conveyors.

As shown in FIG. 18, a grease passageway 430 can be formed in the top of the block 406 and a grease fitting or grease zerk is mounted in the block at the outer end of this passageway. Extending around the pivot pin are fiberglass bushings 432 with one located adjacent the flange 388 and the other located adjacent the outer end of pin passageway 404. Also, a fiberglass thrust bearing 434 can be sandwiched between the inner end of the block 406 in a shallow, circular recess 436 and the flange 388. Hitch mechanism 44 is retained on the central pivot pin 56 by means of an annular retainer plate 436 which can be $7/8^{th}$ inch plate having a central hole measuring $1^{13}/16^{th}$ inch. Both the plate 436 and the pivot pin are formed with aligned holes to receive a dowel pin 438 which acts to prevent rotation of the plate relative to the pin. The plate 436 is held in place by $3\frac{1}{2}$ inch long screw 440 which extends into a threaded hole formed in the center of the pivot pin. It will thus be seen that the hitch mechanism 44 is free to pivot about the horizontal pivot axis formed by the pivot pin thereby allowing relative movement about this pivot axis between the adjacent connected mobile conveyor vehicles.

Figure 24:
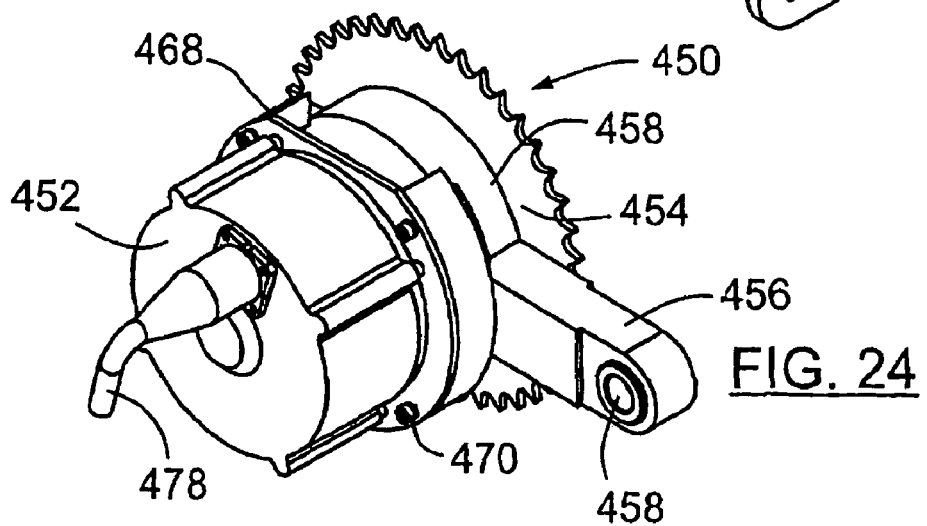
FIG. 24 is a perspective view of an intercar angle sensor assembly mountable on the hitching apparatus.
Figure 25:
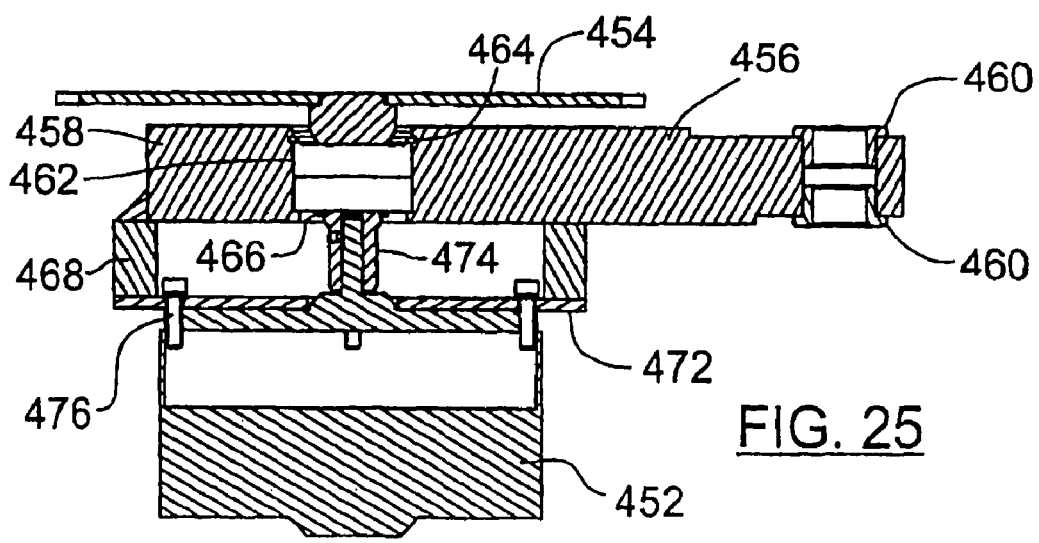
FIG. 25 is an axial cross-section of the sensor assembly of FIG. 24.

For use with an automatic steering system for a train of these mobile conveyor machines of the type described above, it can be desirable for the steering system to know the intercar angle between adjacent cars in the train. Due to the fact that the present mobile conveyor machine has no pivot joint located at the pivot axis between adjacent cars (in other words, there is only a virtual pivot point midway between the two wheels of the machine described herein), a special intercar angle sensor can be provided in conjunction with the pivot mechanism of the present invention so that an electrical signal indicative of the intercar angle can be provided to the steering control for the conveyor train. An exemplary form of such a sensor is illustrated in FIGS. 24 and 25. This sensor indicated generally by reference 450 is able to determine the angle between the central longitudinal axis of the illustrated mobile conveyor machine 10 and a central longitudinal axis of another mobile conveyor machine which can be constructed in the same or a similar manner as the illustrated machine. Although not shown in FIG. 24, the sensor includes the aforementioned tensioned roller chain 374 mounted on the track 46. It will be appreciated that this chain forms a series of sprocket engaging recesses formed along one side of the track for at least most of the length of the track. The other major component of the sensor is a rotational position transducer 452 which is mounted on the hitch mechanism 44 and, in particular, on the roller support body 376. The sensor has a sensing sprocket 454 which drives an encoder to measure the intercar angle. The transducer 452 can, in one embodiment, send a signal to a Siemens programmable logic controller (PLC) used to steer the train of vehicles. This transducer, which can be of standard construction, can have a signal output ranging between 4-20 milliamps with the output depending upon the sensed intercar angle.

With reference to FIGS. 24 and 25, in addition to the transducer, there is shown a mounting arm 456 which includes an annular end section 458 on which the transducer can be mounted. The arm 456 is attached by a pivot pin 457 to the bottom edge of the side plate 392, this pivot pin extending through hole 458. There can be mounted in this hole two Oilite friction bearings 460, one at each end. Rotatably mounting the shaft for the sprocket 454 are two deep groove ball bearings 462 arranged next to one another. The bearings can be held in an opening by means of a retaining ring 464. On the transducer side of the bearings there can be a further external retaining ring 466. Welded to the arm on the side opposite the sprocket is a transducer mount 468 which extends through an arc of more than 270°. Attached to this mount by four screws 470 is a transducer mounting plate 472. The central shaft of the transducer extends through this plate and is received within a central passageway formed in sprocket shaft 474 and is secured thereto (for example by a set screw) for rotation therewith. The transducer is detachably mounted to the plate 472 by four screws 476. The end of an electrical control cable operatively connected to the transducer is indicated at 478.

It will be seen from the above description that the transducer and its mounting are pivotably mounted to the plate 392 of the hitch mechanism. An elongate coil spring 480 (see FIG. 16) is then provided to bias the sensor and in particular its sprocket 454 into engagement with the roller chain 374. The reason for this spring mounting is to provide some flexibility to the sensor mount, thereby reducing the possibility of damage, for example, if something such as dirt or a stone should become lodged in the sprocket or the roller chain. It should also be noted that the roller chain is kept under tension itself by means of an adjustable tension rod 482 at one or both ends of the chain.

Figure 26:
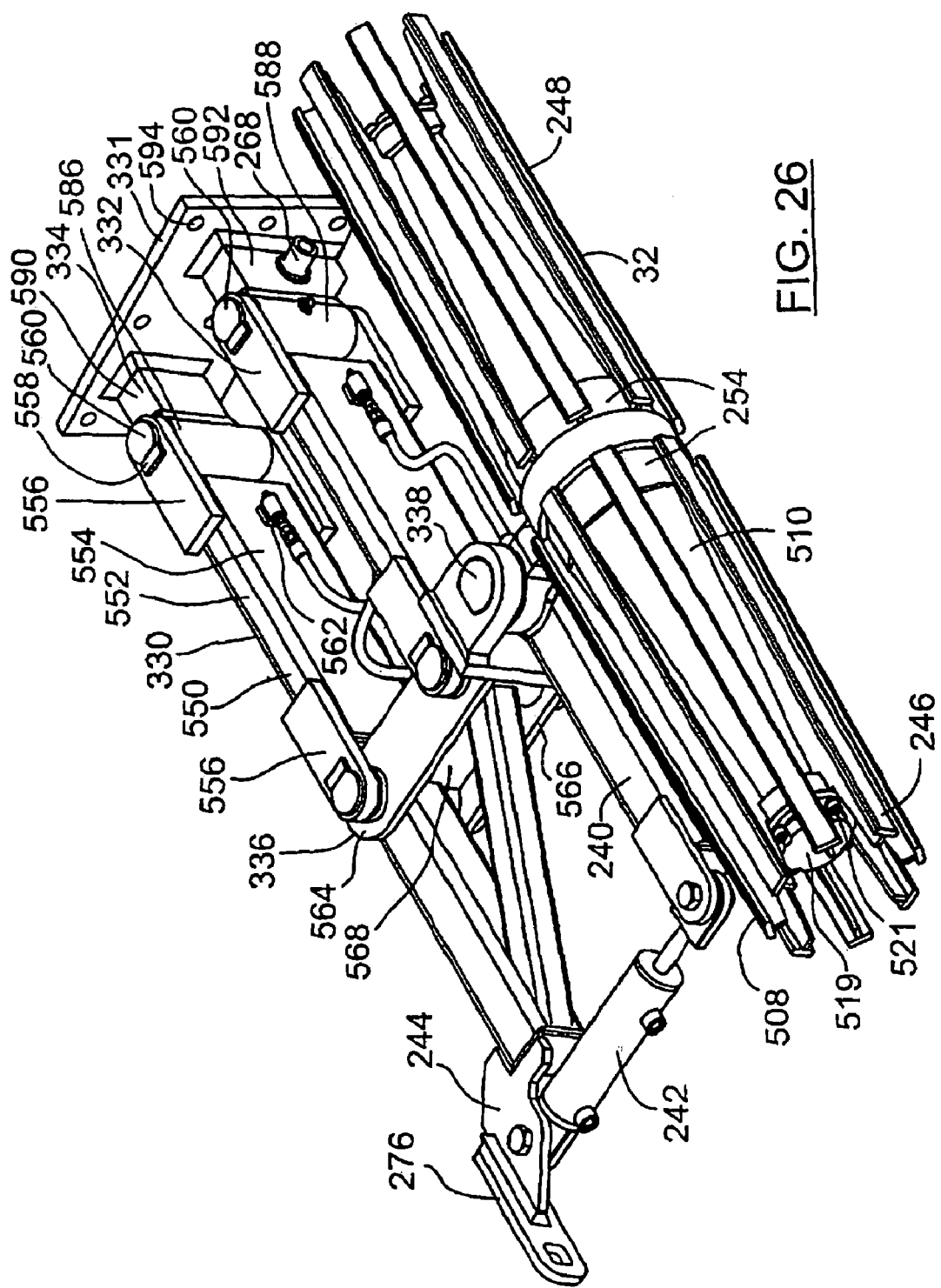
FIG. 26 is a perspective view taken from above and from the inby end showing the tail pulley mechanism and an interconnecting support mechanism for mounting the tail pulley.
Figure 29:
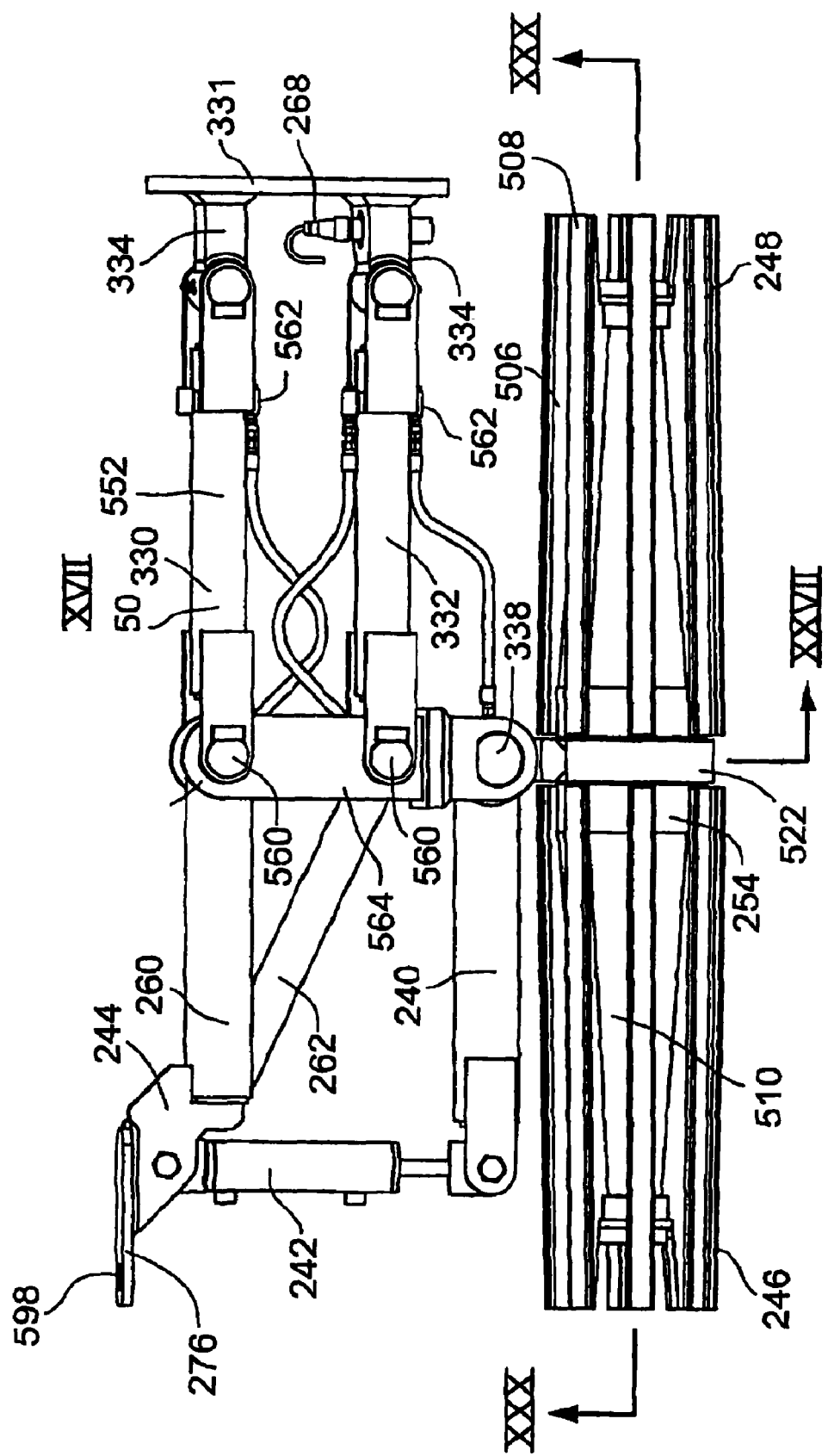
FIG. 29 is a plan view of the tail pulley mechanism and the interconnecting support mechanism of FIG. 26.

Turning now to the mounting mechanism which includes interconnecting support means for the tail pulley 32, this mounting mechanism as seen most clearly in FIGS. 13, 26 and 29 includes two parallel link members 330 and 332 which are pivotably mounted on link mounts 334 mounted on the inside of the frame 16 by a connecting plate 331. The inner ends of the link members are located near or at the longitudinal centreline of the car and are pivotably connected to central mounting frame member 336 which provides support for a generally vertically extending pivot connector in the form of pin 338. Pivotably connected to this pin connector is a belt control arm 240 which in turn is pivotably connected to the actuator rod of a belt training actuator which includes hydraulic cylinder 242. The closed end of this cylinder is pivotably connected to a horizontal support plate 244.

The tail pulley itself comprises two rotatable tail pulley sections 246 and 248 which rotate about a non-rotating central support shaft 250 that extends from opposite sides of a central support portion in the form of a circular support block 252 rigidly connected to one end of the control arm 240. Mounted on opposite sides of the central support portion are two central bearings 512, each rotatably supporting a respective one of the pulley sections 246, 248. In a known manner, the exterior of these pulley sections comprises a series of parallel, spaced-apart metal slats, the inner ends of which are mounted on an annular support block 502. An outer bearing 516 is also mounted on the outer end of each section of the shaft 50 to support the outer end of the respective pulley section. Further support for the tail pulley in the longitudinal direction is provided by horizontally extending frame members 260, 262 which are fixedly connected to the central frame 336 and are also connected to the plate 244.

Figure 27:
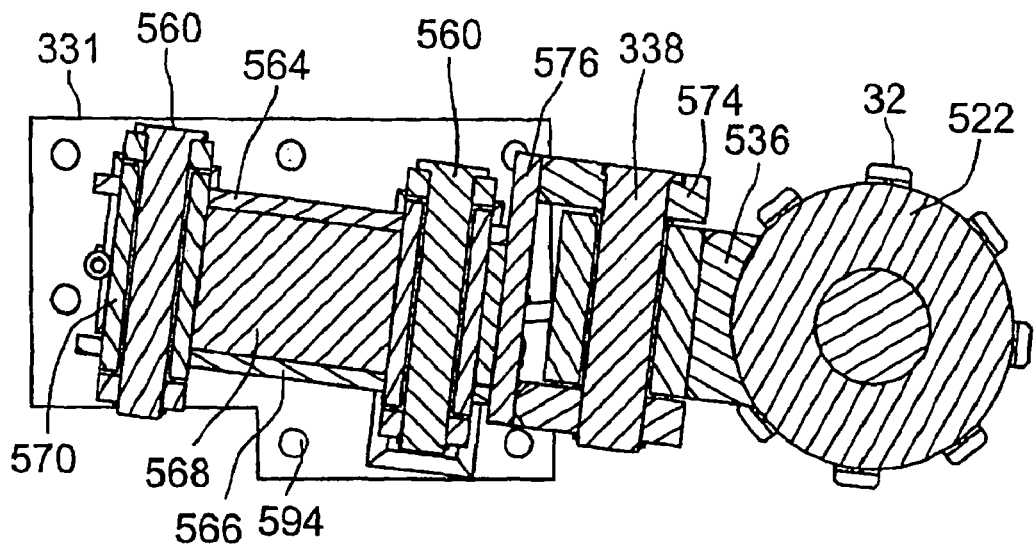
FIG. 27 is a vertical cross-section of the tail pulley mechanism and the interconnecting support mechanism taken along the line XXVII-XXVII of FIG. 29.
Figure 28:
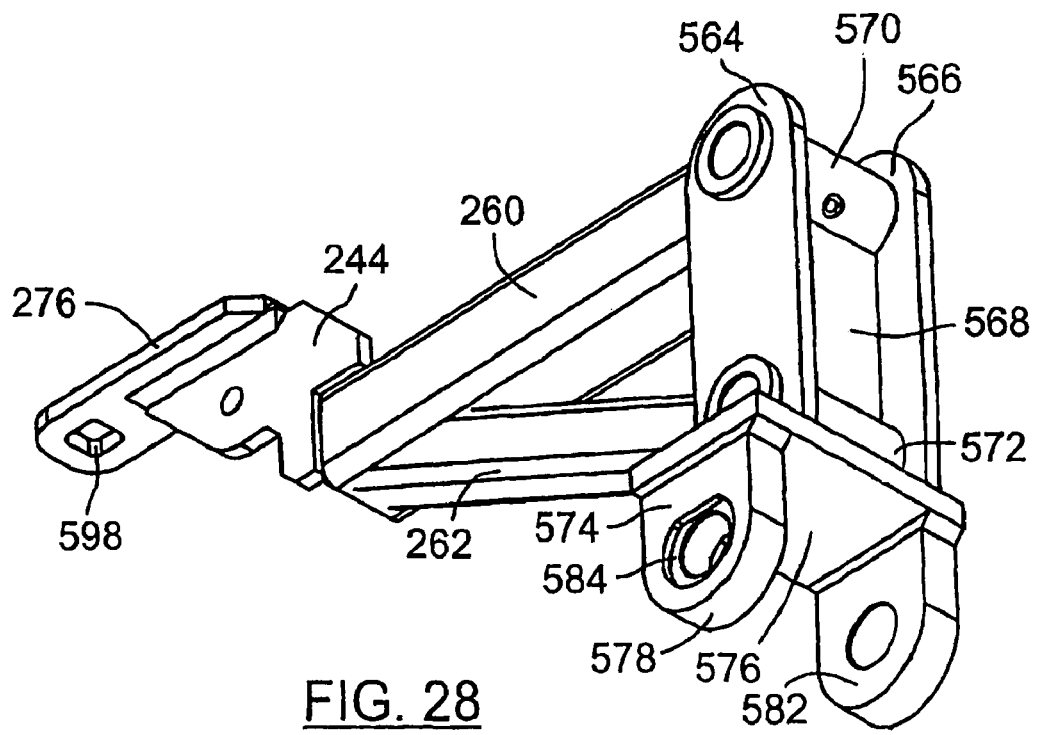
FIG. 28 is a perspective view of a tail pulley take-up member, a component of the interconnecting support mechanism.
Figure 30:
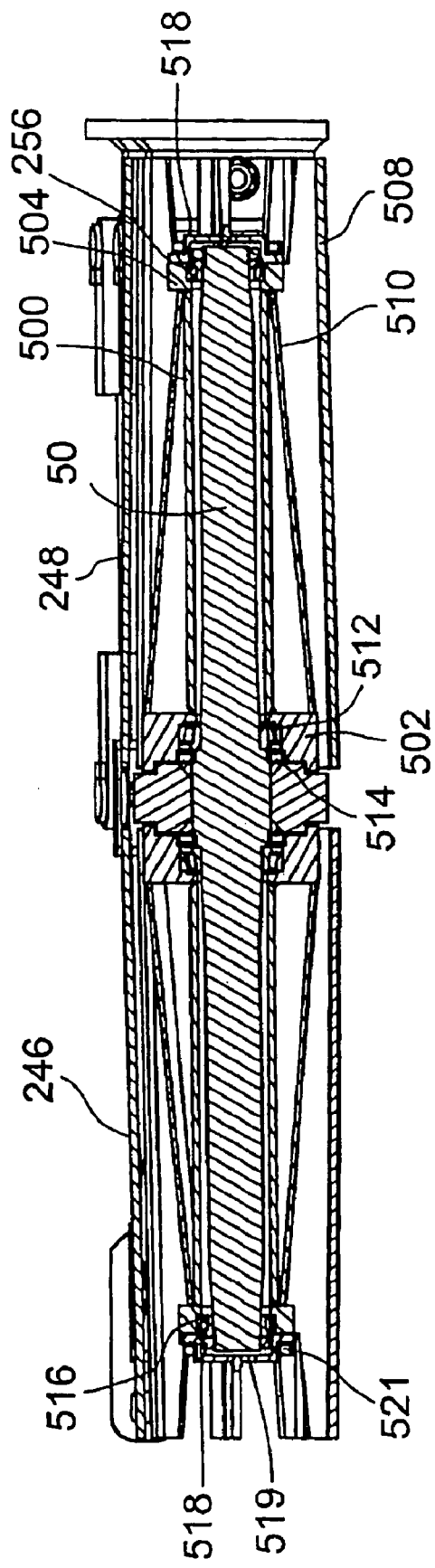
FIG. 30 is a vertical cross-section of the tail pulley mechanism including a pulley support member, this view taken along the line XXX-XXX of FIG. 29.

Details of the construction of the tail pulley mechanism including its two tail pulley sections 246, 248 and the pulley support member on which these pulley sections are mounted for rotation are shown in FIGS. 27, 29 and 30. Each tail pulley section includes an elongate pipe 500 having an annular support block 502 welded to its inner end and a smaller annular support block 504 welded to its outer end. Extending lengthwise along the pipe and distributed about its circumference are a series of slat supporting plates 506 and mounted on the outer edge of each of these plates is a steel strip or slat 508. Extending between and connecting the plates 506 are a series of tapered, connecting plates 510. Roller bearings 512 are mounted within the larger support block 502. In one embodiment these are Timkin tapered roller bearings, Part No. 29586 Cone/29520 Cup. Mounted adjacent these bearings is a suitable seal, for example, a CR seal, type CRWHA1, Part No. 30095. Similarly, the aforementioned outer bearings 516 are mounted in the outer support block 504. In one embodiment, these are Timkin tapered roller bearings, Part No. LM104949 Cone/LM104911 Cup. Holding these bearings in place is a bearing lock nut 518 and a nut washer. Covering the lock nut is an end cap 519 having a circumferential connecting flange. This flange is connected by screws 521 to the support block 504.

Figure 31:
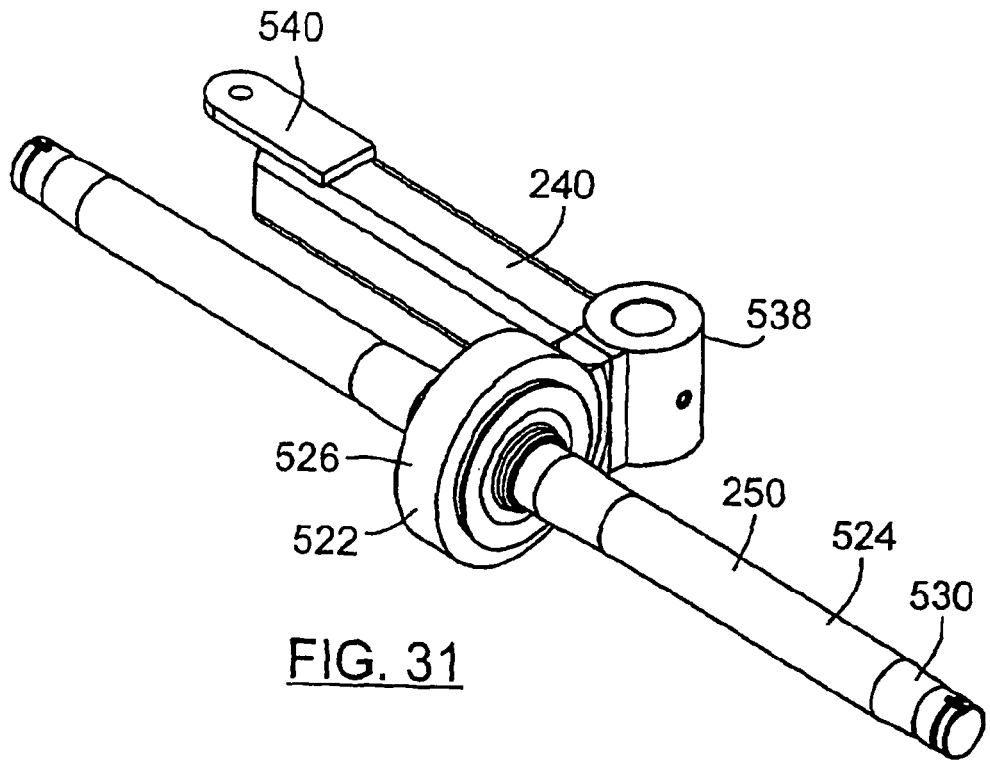
FIG. 31 is a perspective view of the pulley support member and a belt control arm connected thereto.
Figure 32:
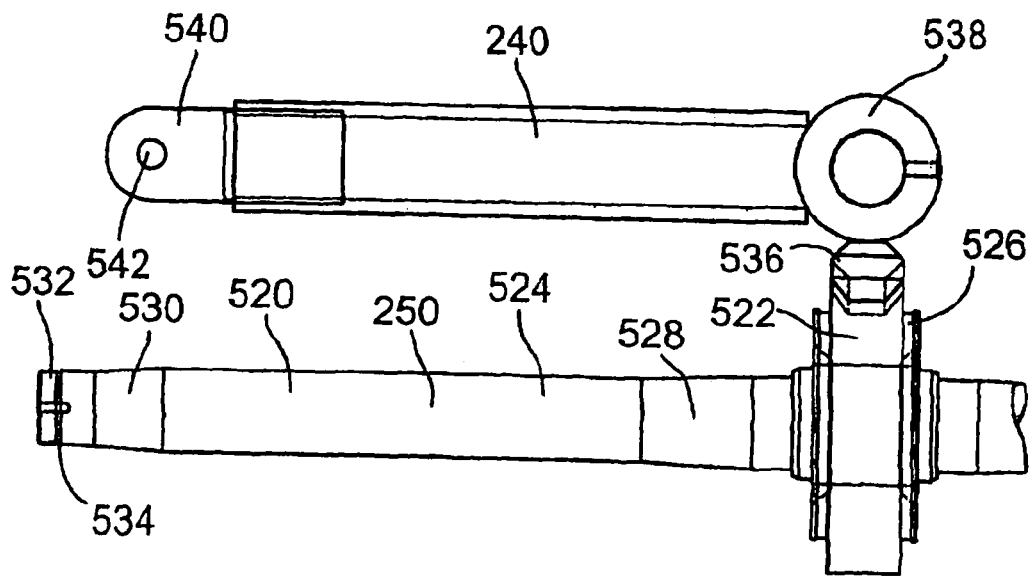
FIG. 32 is a partial top view of the pulley support member and belt control arm of FIG. 31, the right section of the shaft being omitted as it is constructed in the same manner as the illustrated left section.
Figure 33:
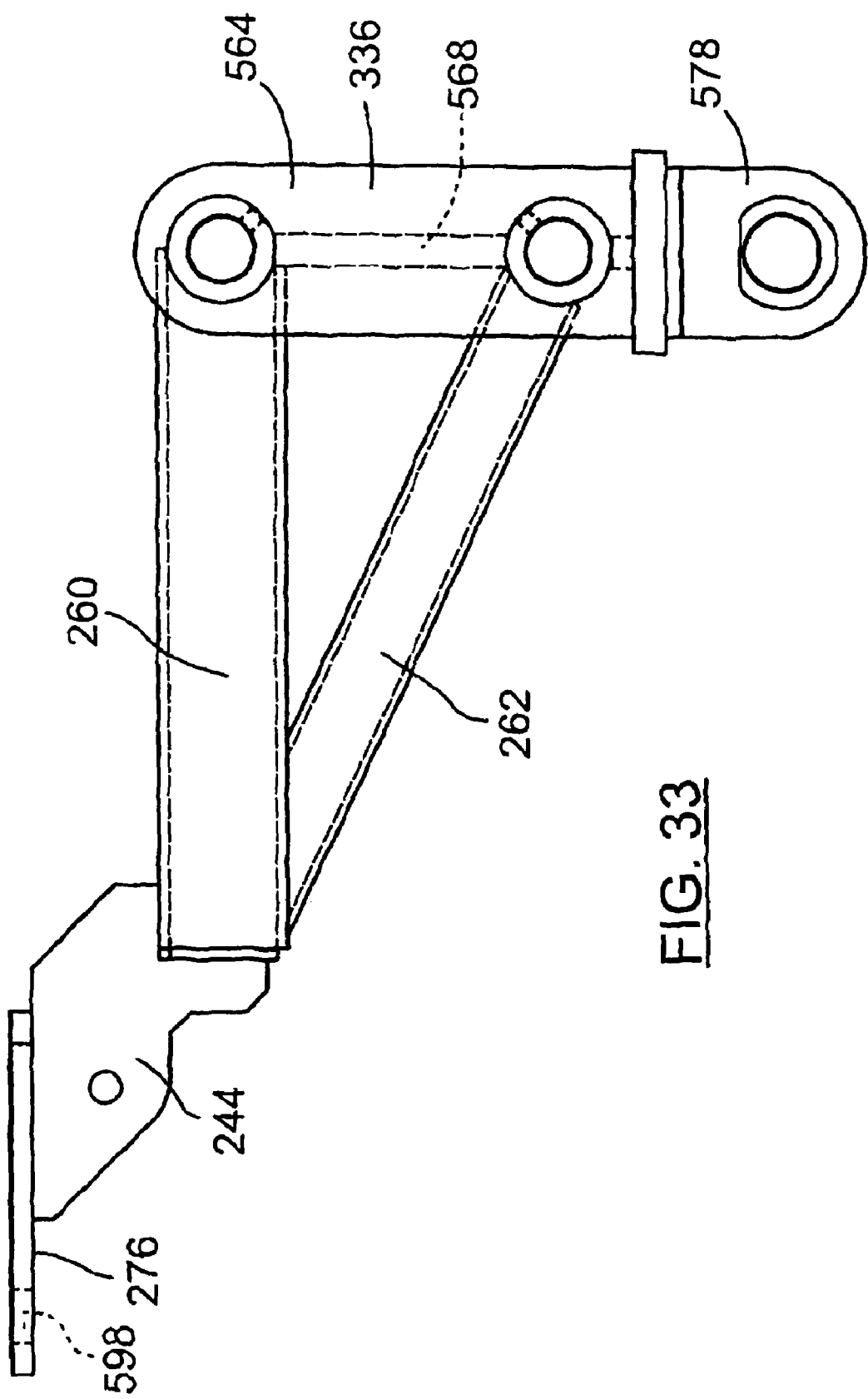
FIG. 33 is a top view of the tail pulley take-up member of FIG. 28.
Figure 34A:
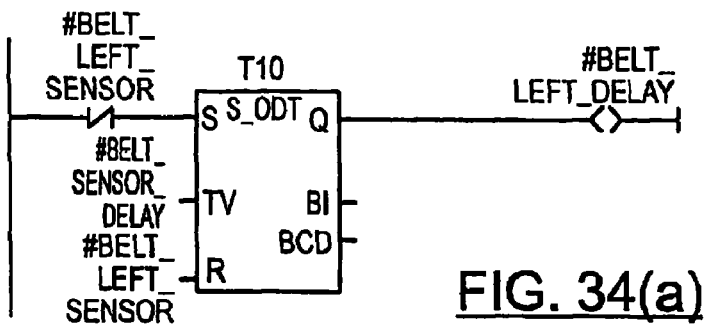
FIG. 34a to 34e are a series of diagrams illustrating the PLC program file for controlling the conveyor and belt training system.
Figure 34B:
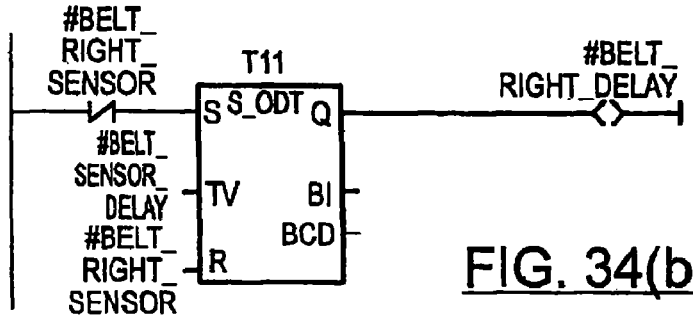
Figure 34C:
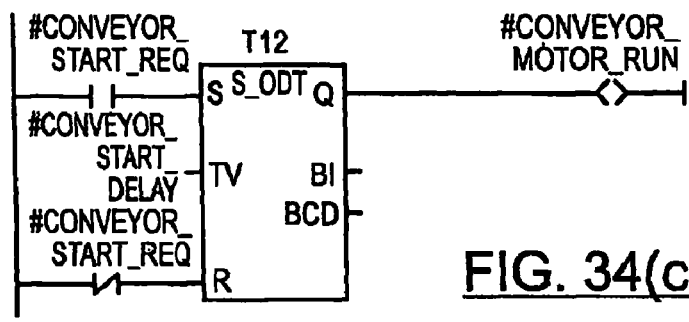
Figure 34D:
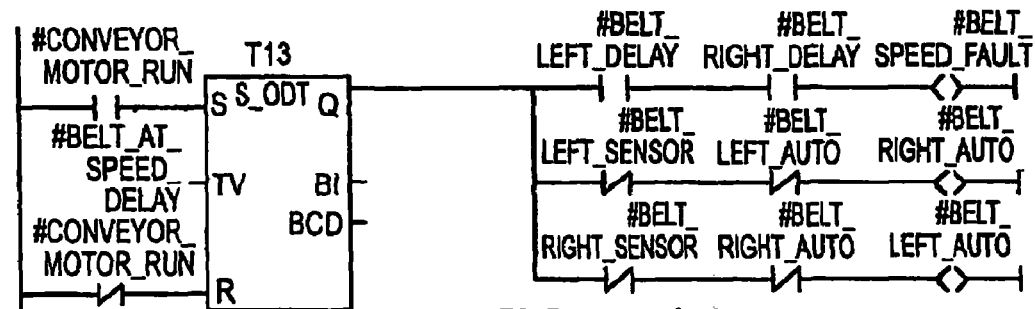
Figure 34E:
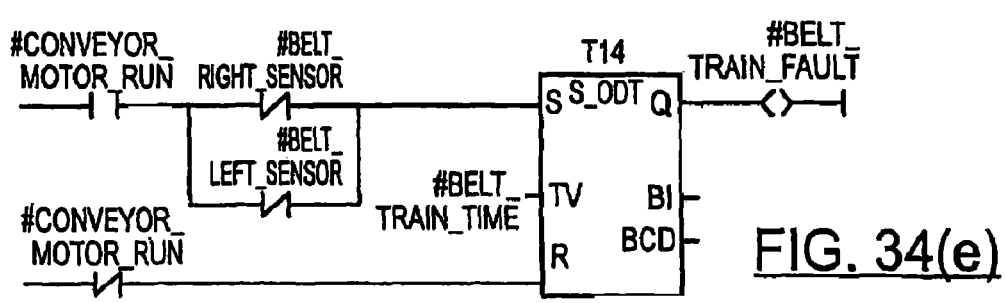

Turning now to the construction of the pulley support member indicated generally at 520 in FIGS. 31 and 32, this member includes the aforementioned support shaft which is divided into two similar outer sections and a central support portion 522. In the illustrated embodiment, the shaft is formed from two mild steel members including elongate shaft member 524 and an annular central member 526 through which the shaft member 524 extends. The central member 526 is secured to the member 524 by heating the member 526 to a temperature in the range of 350° to 400° F., placing it centrally on a thicker, central portion of the member 524 and then slowly cooling the member 526. The shaft member 524 can have tapered portions at 528 and 530. Each outer end of the shaft member 524 is threaded at 532 in order to attach the aforementioned lock nut 518. A key seat 534 can be provided for a key to hold the lock nut in place.

Attached to one side of the central support portion 522 is a short connecting block 536 made from steel plates and connected to pivot pin sleeve 538. Rigidly attached to one side of this sleeve (such as by welding) is the control arm 240 which can be tubular with a square cross-section. As shown, this arm 240 extends parallel to the adjacent section of shaft member 524. Connected to the top of the control arm 240 is a connecting plate 540 which is attached by a suitable pivot pin extending through hole 542 to the actuator rod of the hydraulic cylinder 242.

The exemplary link members 330, 332 as shown are of identical construction and are best seen in FIG. 26. Each link member or swing arm comprises a rectangular hollow arm member 550 which includes an elongate top plate 552, a similar bottom plate, and two flat, rectangular side plates 554. There are also two rectangular end plates (not shown) which extend between the top and bottom plates and between the two side plates. Mounted to the top plate 552 are two connector plates 556, each of which has a circular hole at one end to accommodate a pivot pin. A rectangular bump 558 can be provided adjacent each of the holes in order to engage a flat side on the head of the respective, adjacent pivot pin 560. It will be appreciated that there are two pivot pins at the inner ends of the swing arms and two pivot pins at the outer ends of the swing arms. Mounted on both sides of each swing arm is an optional grease line coupler 562. The lines attached to each coupler can provide grease to a respective pivot pin 560, 338. In one embodiment, each pivot pin 560 is a 1¼ inch pin having a length of 8 1/16 inch, including its enlarged head. The bottom end of each pin can be formed with an annular recess to accommodate a ring retainer.

With respect to the illustrated construction of the central mounting frame member 336, this member includes a flat top plate 564 and a similar bottom plate 566 and extending between these two plates and connecting same is a vertical plate 568. Located at opposite ends of the plate 568 are two, similar cylindrical sleeves 570 and 572, each of which can be provided with a short passageway at its center for introduction of grease by means of a grease zerk or the aforementioned grease line connected thereto. A pivot pin bracket 574 is welded to the side of the sleeve 572 and includes rectangular connecting plate 576 and two lugs or ears 578, 582, each having a hole to accommodate the pivot pin 338. The lug 578 can be formed with a shallow recess at 584 to accommodate the head of the pivot pin and this recess can be flat on one side to accommodate a flat side of the head of the pivot pin, thereby preventing rotation of the pivot pin in the lug openings. It should be noted here that although the pin 338 forms the pivot axis which extends generally vertically, in the exemplary embodiment shown, this pivot axis extends at a small acute angle to vertical, this angle corresponding approximately to the angle of inclination of the conveyor belt that extends around the tail pulley sections. In one embodiment of the conveyor vehicle, this angle of inclination is less than 10°. As used herein in connection with the pivot axis formed by the pin 338, the expression "generally vertically extending" or equivalent description includes not only a vertical pivot axis but also one extending vertically but at an acute angle to a vertical axis. The frame member 260, which can be tubular in its construction with a square transverse cross-section can be welded to the side of the sleeve 570, extending at a 90° angle to the plate 568. The frame member 262 can also be tubular in its construction with a square transverse cross-section. This frame member is welded to the side of the sleeve 572 and to an end section of the frame member 260.

The interconnecting support mechanism for the pulley support member includes the aforementioned link mounts 334. As shown, these include two cylindrical sleeves 586, 588, each of which is welded to a mounting block 590, 592. The base of each of these blocks is welded to the connecting plate 331 which has a number of bolt receiving holes 594. In one embodiment there are eight holes 594 distributed over the plate with each hole measuring 25/32 inch. Each mounting block and its respective sleeve is mounted at a small acute angle to vertical, this angle corresponding to the desired angle of the pivot pin 338 relative to vertical.

The mounting block 592 can be made bigger than the block 590 in order to accommodate a horizontal hole formed therein to receive the photoreceiver 268 which is part of the photosensor system explained below.

The position of the tail pulley can be adjusted for belt training purposes either manually using the actuator or hydraulic cylinder 242 or automatically. In order to provide an optional automatic adjustment system for correcting the position of the conveyor belt, a photosensor system such as a light beam sensor arrangement can be provided adjacent each end of the tail pulley. As illustrated, there are two photoemitters 266 mounted on the curved track 46. For each of these photoemitters there is a photoreceiver 268 which can be seen in FIG. 13. As long as the conveyor belt is properly centered on the tail pulley, pulses of a light beam can travel from each photoemitter 266 (through the gaps in the adjacent pulley section) to its respective photoreceiver which is mounted on the inside of one of the longitudinal frame members forming the frame 16. However, if the belt moves transversely on the tail pulley so as to block entirely one of the light beams, this indicates to a programmable logic controller (for example, by stopping transmission of a control signal or signals) which in turn causes retraction or extension of the actuator rod of the hydraulic cylinder 242. The actuator rod will move in a direction so as to cause the central shaft of the tail pulley to be pivoted in a substantially horizontal plane so as to tighten the belt on the side to which the belt has moved. This will tend to cause the belt to move back towards a desired central region of the tail pulleys.

In an exemplary embodiment, each photosensor is aligned with the end section of the tail pulley so that the light beam is regularly broken by the parallel slats on the exterior of the tail pulley. Because of this arrangement, each photoreceiver sends a pulse signal to the programmable logic controller when the belt is not entirely blocking the light beam. Thus, if the belt is properly centered, pulse signals are being sent to the controller by both photoreceivers 268. When a pulse signal is not being emitted by one of the light receivers, then this indicates that the belt has moved too much in the direction of this particular receiver and the control system will take steps to re-center the belt.

Shown in FIGS. 34(*a*) to 34(*e*) are a series of diagrams illustrating the programmable logic controller (PLC) program file for controlling the conveyor belt training system by means of the aforementioned photosensors. The programmable logic controller in one embodiment is a Siemens 57314C. In one exemplary conveyor train, there are fifteen conveyor vehicles, including thirteen intermediate cars of the type illustrated in FIGS. 1 to 5, a discharge car having two pairs of wheels, and a loading car with a single pair of wheels. There is a programmable logic controller provided for each pair of wheels and thus there is one controller for each vehicle of the train except the discharge car which has two of these controllers. The controller of each car will operate in a similar manner insofar as the belt training system is operated by these controllers.

Shown in FIG. 34(*a*) is a first step in the programming sequence, this step being known as the belt left sensor delay. According to this step, if the photoreceiver 268 on the left side of the conveyor belt is blocked by the belt so that it is receiving no pulse signal, the controller determines whether the sensor has been blocked for a predetermined period of time, for example, two seconds. If the belt left sensor has been blocked for this period of time, the controller will energize the belt left delay bit. For purposes of FIG. 34, the letter R stands for reset, the letters TV stands for timer variable, the letter S means "timer enables" and the letters S_ODT stand for on down timer.

The second step represented by FIG. 34(*b*) can be termed the belt right sensor delay. This is essentially the same controller step as the first step of FIG. 34(*a*) but is for the belt right sensor. According to this step, if the belt right sensor is off for a predetermined period of time, for example, two seconds, then the controller will energize the belt right delay bit. Again, it will be understood that the belt right sensor would be off or blocked if the belt conveyor has strayed too far to the right on the tail pulley and is blocking the photoreceiver 268 on the right side.

The third step in the control sequence is represented by FIG. 34(*c*) which is the conveyor start command step. According to this step, the controller will determine whether or not it has received a request for the conveyor to start. It should be understood that in the case of a conveyor train involving a plurality of conveyor vehicles linked together, the conveyors must start in a proper sequence in order for the conveyor train to properly convey the material. In one exemplary embodiment, one conveyor vehicle, for example, the third conveyor vehicle, will provide the necessary start signal to the next conveyor vehicle in line, which would be the fourth conveyor vehicle. For proper operation of the conveyor system, the conveyor at the outby end of the train (normally a discharge conveyor vehicle) starts the operating sequence so that the conveyor vehicle at the inby end is the last vehicle to have its conveyor belt started. Thus, returning to controller step illustrated in FIG. 34(*c*), if that particular conveyor vehicle has received a conveyor start request, its controller will wait a predetermined period of time, for example two seconds, before starting the conveyor motor running. This delay helps to ensure that the preceding conveyor, that is the conveyor of vehicle 3 in the example is up to speed before the conveyor of vehicle 4 starts.

Turning now to the fourth controller step illustrated in FIG. 34(*d*), this step can be referred to as the belt left/right command step. The controller first checks to determine if it has received a signal to run its particular conveyor and, if it has received such a signal, the controller waits a predetermined period of time, for example, four seconds, before carrying out any of the three controller steps indicated on the right side of FIG. 34(*d*). After the predetermined delay, the controller checks if both the belt left delay bit and the belt right delay bit (see steps 1 and 2) have been energized and, if this is true, the controller sets the "belt speed fault" bit which results in the entire conveyor train being turned off. This is a safety measure because if this control check is true, this indicates that that particular conveyor belt is not moving and therefore there is a problem which requires the conveyor train to be shut down.

In the next control step taken by the controller, the controller determines if only the belt left sensor has been blocked by the conveyor belt. Because the belt left sensor is a normally closed contact when this sensor, that is the left photoreceiver is blocked, the sensor will pass power to the belt left auto (which also has a normally closed contact), thereby energizing the belt right auto which will result in the hydraulic cylinder 542 moving in a direction which causes the conveyor belt to go right. In other words, the hydraulic cylinder causes the tail pulley to be pivoted about the pivot pin 338 so that the tension on the left side of the belt is increased.

According to the third control step illustrated in FIG. 34(*d*), if the belt right sensor is blocked so that the belt right delay bit is energized, power is passed through to the belt right auto and onto the belt left auto, thereby causing the hydraulic cylinder to move the conveyor belt to the left. Note that in this system, the belt right auto and the belt left auto are linked so that both cannot be energized at the same time.

Turning to the fifth control step illustrated by FIG. 34(*e*), this step can be referred to as the belt train fault step. According to this step, the controller determines first if a conveyor run request for its particular conveyor is true, that is, it has been received, and also whether or not either of the belt sensors have been blocked (that is, off) for a predetermined period of time, for example, ten seconds. If the controller determines that this situation exists, it then sets the belt train fault bit which causes the conveyors of all of the train to be shut down. This step recognizes that if one of the belt sensors has been blocked for an excessive amount of time, for example, ten seconds, then there is a problem with the belt training system of that particular conveyor vehicle that needs to be fixed before further operation of the conveyor train.

Figure 35:
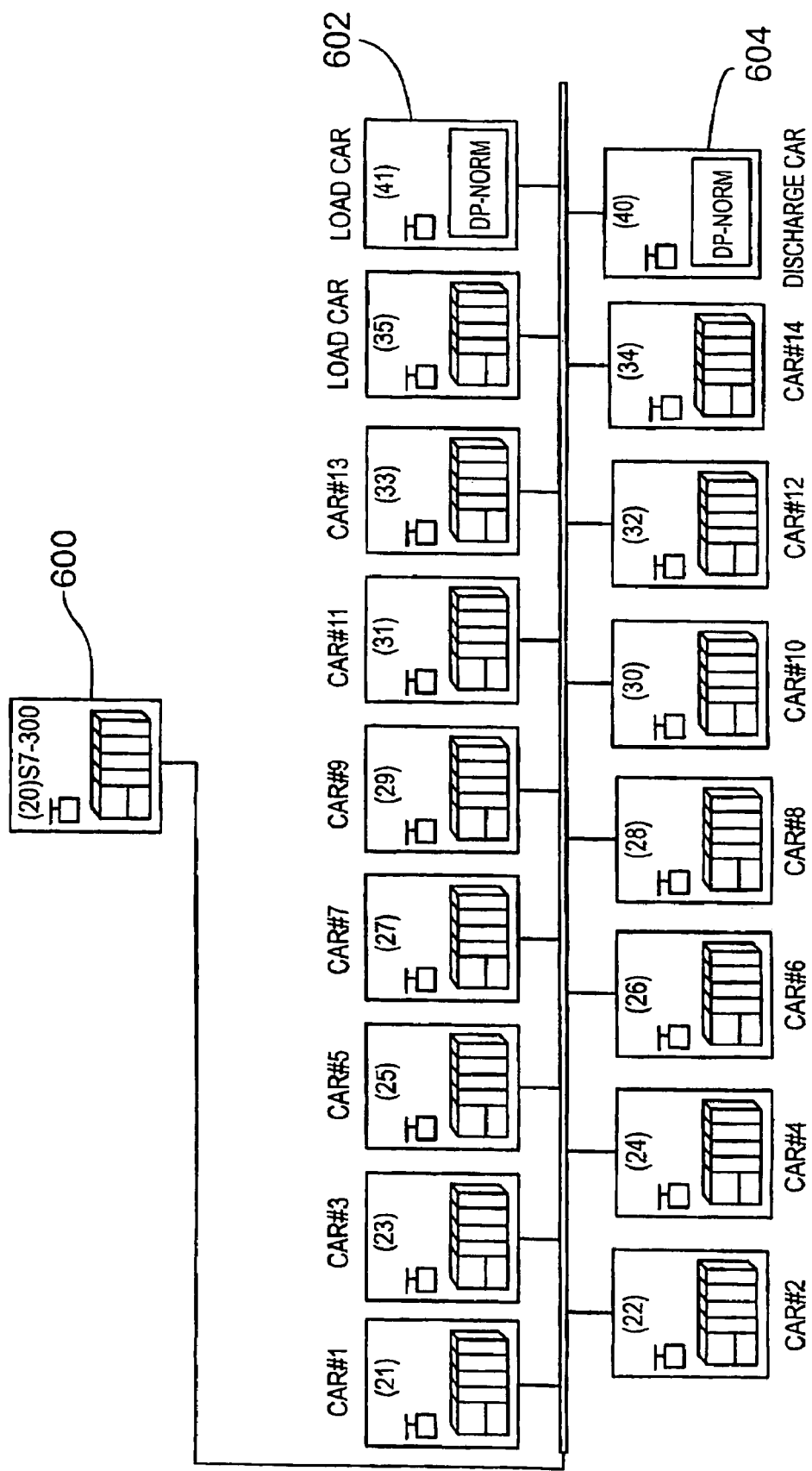
FIG. 35 is a schematic illustration of a network of programmable logic controllers for a train of mobile conveyors.

FIG. 35 illustrates an exemplary network of programmable logic controllers for a train of mobile conveyor apparatus as described above. This control system operates by means of a master PLC indicated at 600 which can be located on the discharge car which, as indicated, is preferably equipped with two PLC's, one for each of its two pairs of wheels since the PLC's can also be used for steering purposes. There are fifteen intelligent slave PLC's in this particular system which can be numbered from one to fifteen and which, as shown in the drawings, have Profibus addresses numbered from 21 to 35. In a preferred embodiment, the PLC's are operated by wireless radio commands using two radios, one radio located on the discharge car and the second radio located at the load car. The load car radio is indicated at 602 while the discharge car radio is indicated at 604. In this way, a train of conveyor vehicles can be operated from either end of the train but all commands come from the master PLC and go to the others by the Profibus system. The same computer code can be used in each of the slave PLC's so that the conveyor cars are interchangeable for any particular job. It will be understood that the load car radio will be used by the load car operator to operate the conveyor system when a mining operation is underway. The discharge car radio can be used by the discharge car operator who may also be operating the cross-conveyor on the discharge car. The radio control system is interlocked so as to prevent conflicting signals, with the switch determining which radio is operable being located on the load car. As illustrated in FIG. 35, the discharge radio can be assigned Profibus address 40 while the load car radio can be assigned Profibus address 41.

By linking together the PLC's of the conveyor vehicles in a conveyor system as indicated, the operation of the conveyor belts can be interlinked so as to provide a smooth and efficient operation of the conveyor train. As indicated above, if the sensor system on one particular car determines that its conveyor belt is in fact not turning when it should be, the complete conveyor train system can be shut down automatically until the problem is resolved. Similarly, if the aforementioned sensor system on any one of the conveyor cars indicates that the belt training system of that car is not operating properly, again the PLC system can work together to shut down the entire conveyor train until the problem has been resolved.

Figure 36:
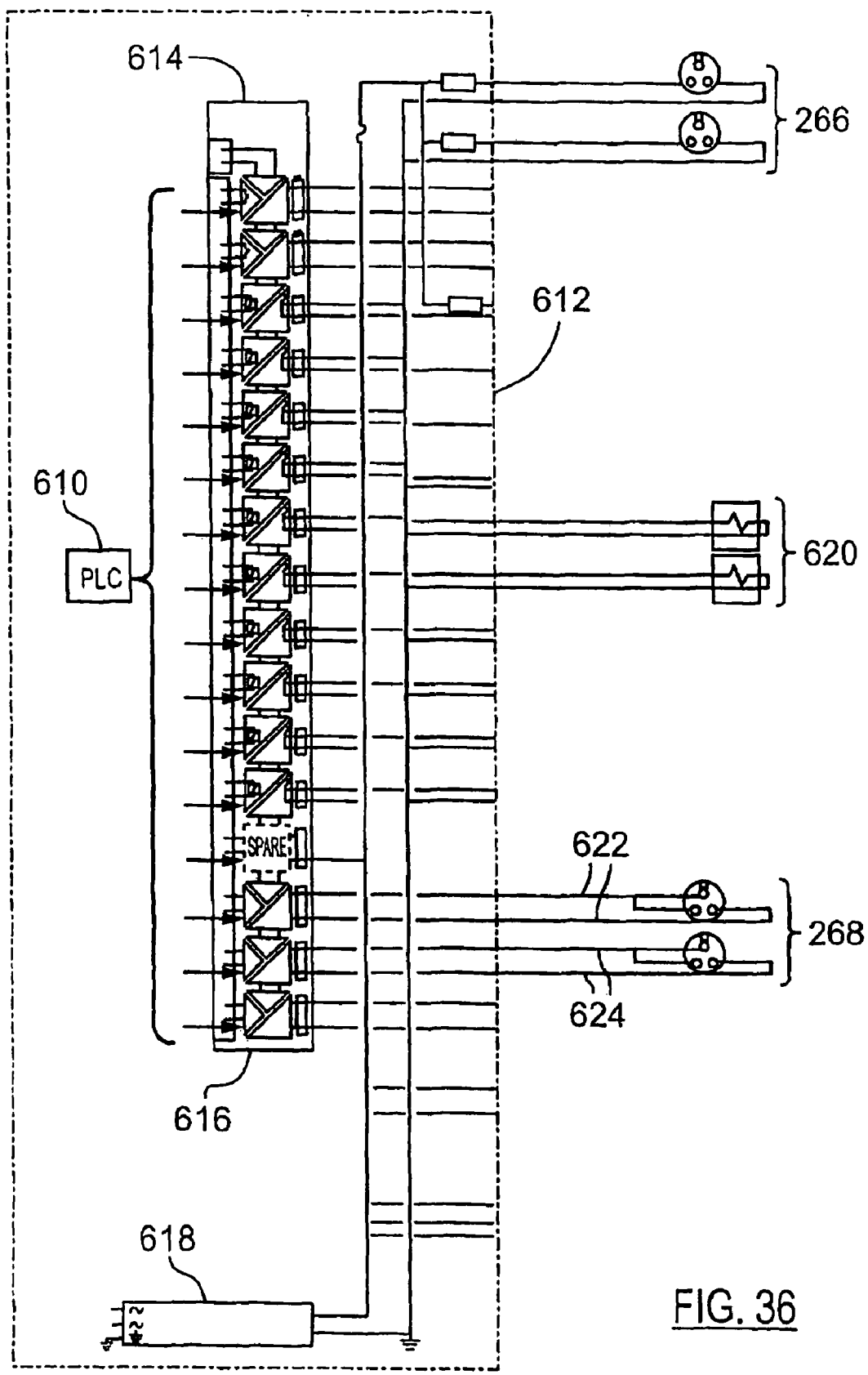
FIG. 36 is an electrical circuit diagram illustrating the circuits connected to the PLC to operate the conveyor belt and the belt training system.

Illustrated in FIG. 36 are the electrical circuits that are connected to the programmable logic controller of one conveyor apparatus, this slave PLC being indicated at 610 schematically. This PLC is housed in a flame proof enclosure indicated schematically by the chainlink line 612, this enclosure being mounted at a suitable location on the vehicle. Mounted in this enclosure as well is a rack 614 on which a number of intrinsically safe barriers indicated generally at 616 can be plugged into, these barriers which are well known in the mining equipment art are provided to prevent overheating, etc., which could cause a fire. The two photoemitters 266 are shown schematically in this figure and these are connected to a 12 volt intrinsically safe power supply 618 which is housed in the enclosure 612. The photoemitters can be standard units such as the intrinsically safe photoemitters sold by Banner Engineering. The photoemitters are turned on when the conveyor itself is turned on at the main switch. Also shown are two solenoids 620 which are connected electrically to the PLC 610 and operate their respective two hydraulic valves that operate the hydraulic cylinder 242. The upper of the two solenoids is the belt right solenoid which is turned on to move the belt to the right, while the bottom solenoid is the belt left solenoid to move the belt to the left. The final two components illustrated in this figure are the two photoreceivers at 268 which are connected by electrical lines 622 and 624 to the PLC 610. The photoreceivers can be the intrinsically safe type sold by Banner Engineering and are of standard construction.

As shown in FIGS. 14 and 15, extending from a small winch 270 is a two inch wide nylon strap 272. The winch and strap are positioned above one photoreceiver 268 and are mounted on the inside of the main frame 16 of the vehicle. The strap extends to a metal hook which extends through a hole 598 formed in the end of a vertical connecting plate 276. The plate 276 is rigidly connected to one edge of the horizontal plate 244. It will be appreciated that once the conveyor belt is mounted in place and extends around the tail pulley (as well as the head pulley) the conveyor belt can be tensioned properly by pulling on the strap 272 which in turn will cause the support frame members 260, 262 and the central frame 336 to move in a direction towards the tail pulley end of the vehicle.

While the present invention has been illustrated and described as embodied in an exemplary embodiment, ie. an embodiment having particularly utility for use as a low profile, mobile conveyor vehicle suitable for use with other similar conveyor vehicles, it is to be understood that the present invention is not limited to the details shown herein, since it will be understood that various omissions, modifications, substitutions and changes in the forms and details of the disclosed conveyor vehicle, its tail pulley mechanism and their method of operation may be made by those skilled in the art without departing in any way from the spirit and scope of the present invention. For example, those of ordinary skill in the conveyor art will readily adapt the present disclosure for various other conveyor applications without departing from the spirit and scope of the present invention.

The invention claimed is:

1. A conveyor apparatus for use with a continuous flexible conveyor belt, said apparatus comprising:
    an elongate conveyor support frame having opposite longitudinal sides extending between two frame ends;
    a plurality of conveyor belt supporting devices mounted on and distributed along said support frame for rotatably supporting said conveyor belt, said conveyor belt supporting devices including one belt direction reversing tail pulley mechanism having two tail pulley sections mounted on a pulley support member for rotation about a common central axis of rotation extending generally transversely relative to said longitudinal sides, said tail pulley sections having adjacent inner ends, said pulley support member including a central support portion located at the inner ends of the pulley sections and extending radially outwardly from said inner ends relative to said axis of rotation to a generally vertically extending pivot axis;
    an interconnecting support assembly for mounting said pulley support member in the conveyor support frame, said interconnecting support assembly including a pivot connector connecting said central support portion to the interconnecting support assembly for pivotal movement about said pivot axis; and
    a pivot mechanism for pivoting said pulley support member and the tail pulley sections about said pivot axis to maintain said conveyor belt within a desired central region of the tail pulley formed by the tail pulley sections during use of the conveyor apparatus, said pivot mechanism including a belt control arm fixedly connected to said central support portion for pivotal movement therewith and a hydraulic linear actuator pivotally connected to said control arm.

2. A conveyor apparatus according to claim 1 wherein said hydraulic linear actuator has an actuator rod pivotally connected to said control arm.

3. A conveyor apparatus according to claim 1 wherein said interconnecting support assembly includes two parallel, spaced-apart link members pivotally mounted to said conveyor support frame and having inner ends located near or at a longitudinal centerline of the conveyor support frame and a central mounting frame member pivotally connected to said inner ends of the link members and having said pivot connector provided thereon.

4. A conveyor apparatus according to claim 1 wherein said pulley support member includes two coaxial central shaft sections extending from opposite sides of said central support portion and wherein inner end and outer end bearings are mounted on each of said shaft sections to rotatably support a respective one of said pulley sections on its shaft section.

5. A conveyor apparatus according to claim 1 including sensor means for sensing a shift of said conveyor belt out of said desired central region and for indicating said shift to an electronic controller adapted to control operation of said pivoting mechanism.

6. A conveyor apparatus according to claim 5 wherein said sensor means comprises two photoemitters and two photoreceivers each aligned with a respective one of the photoemitters, each photoemitter together with a cooperating one of said photoreceivers is located adjacent an outer end section of a respective one of said pulley sections, and during use of said sensor means blockage of a light beam from either photoemitter to its photoreceiver by the conveyor belt causes that photoreceiver to indicate said blockage to said controller which causes said pivot mechanism to pivot said pulley support member in a direction which increases tension in said conveyor belt on the longitudinal side thereof where the light beam was blocked.

7. A conveyor apparatus according to claim 1 including a pair of transversely aligned wheel units for supporting and moving said conveyor apparatus, each wheel unit having a wheel support structure connected to a respective one of said longitudinal sides of the support frame and a wheel mounted on said wheel support structure for pivotable movement about a respective, substantially vertical pivot axis for steering the conveyor apparatus.

8. A conveyor apparatus according to claim 1 wherein said belt supporting devices includes a belt direction reversing head pulley and a series of non-driven, spaced-apart roller devices, said tail pulley mechanism and said head pulley are each mounted on said support frame adjacent a respective one of said frame ends, and said conveyor apparatus includes motor means for rotating said head pulley and thereby driving said conveyor belt.

9. A conveyor apparatus for use with an endless, flexible conveyor belt for conveying mined materials, said apparatus comprising:
   an elongate conveyor support frame having opposite longitudinal sides extending between two frame ends;
   a plurality of conveyor belt supporting devices mounted on and distributed along said support frame for rotatably supporting said conveyor belt, said conveyor belt supporting devices including one belt direction reversing tail pulley mechanism mounted on a pulley support member for rotation about a central axis of rotation extending generally transversely relative to said longitudinal sides;
   a support device for mounting said pulley support member on the conveyor support frame, said pulley support member being mounted on said support device for pivotal movement about a generally vertically extending pivot axis provided by said support device and located centrally between said longitudinal sides of the support frame, said support device including two parallel link members pivotally mounted on said conveyor support frame and having inner ends located at or near a longitudinal centerline of the conveyor support frame and a central mounting frame member pivotally connected to said inner ends of the link members, said pulley support member being pivotally connected to said central mounting frame member;
   an actuator for pivoting said pulley support member and its tail pulley mechanism about said pivot axis to maintain said conveyor belt within a desired central region of the tail pulley mechanism during use of the conveyor apparatus;
   a controller for controlling operation of said actuator; and
   a sensor for sensing a shift of said conveyor belt out of the desired central region and for indicating said shift to said controller, wherein said controller causes said actuator to pivot said pulley support member in a direction which tends to increase tension in said conveyor belt on the longitudinal side thereof upon receipt of a signal from said sensor that the conveyor belt has shifted out of said desired central region.

10. A conveyor apparatus according to claim 9 wherein said tail pulley mechanism comprises two coaxial tail pulley sections mounted in an end-to-end manner, each tail pulley section includes an elongate inner support section rotatably mounted on said pulley support member and a series of spaced-apart metal slats distributed circumferentially around said inner support section and mounted thereon, and air gaps are formed between the adjacent metal slats.

11. A conveyor apparatus according to claim 9 wherein said actuator is a hydraulic linear actuator having an actuator rod, said pulley support member has a belt control arm rigidly connected to a central support portion of the pulley support member, and said hydraulic linear actuator rod is pivotally connected to an outer end of the belt control arm.

12. A conveyor apparatus according to claim 9 wherein said conveyor apparatus is a low profile conveyor vehicle having a height not exceeding five feet and include a pair of transversely aligned wheel units for supporting and moving said conveyor apparatus, each wheel unit having a wheel support structure connected to a respective one of said longitudinal sides of the support frame and a wheel mounted on said wheel support structure for pivotable movement about a respective, substantially vertical pivot axis for steering the conveyor apparatus.

13. A conveyor apparatus according to claim 9 wherein said sensor includes two photoemitters and two photoreceivers each aligned with a respective one of said photoemitters to receive a light beam from its respective photoemitter and each photoemitter and its aligned photoreceiver are located adjacent a respective one of two outer end sections of said tail pulley mechanism.

14. In a conveyor apparatus for use with an endless conveyor belt which extends around two belt direction reversing pulley devices located at opposite ends of the conveyor apparatus and is operable under tension:
   a conveyor support frame;
   a non-rotating pulley support member on which one of two pulley devices is mounted for rotation about an axis of rotation;
   a movable support device for mounting said pulley support member on the conveyor support frame, said pulley support member being mounted on a portion of said support device for pivotable movement about a generally vertically extending pivot axis, said movable support device including two parallel, spaced-apart link members pivotably mounted to said conveyor support frame and having inner ends located near or at a longitudinal centerline of the conveyor support frame which is elongate and substantially rectangular in plan view and a central mounting frame member pivotally connected to inner ends of the link members, said pulley support member being pivotally connected to said central mounting frame member;
   an actuator for pivoting said pulley support member and its pulley device about said pivot axis to maintain said conveyor belt in substantially centered running alignment with said one pulley device during use of the conveyor apparatus; and an adjusting mechanism for adjusting the position of said portion of said support device relative to said support frame in order to increase or decrease the overall tension in said conveyor belt, said adjusting mechanism being connected to said movable support device and capable of moving said portion of said support device, said pulley support member and its pulley device towards or away from the other pulley device to decrease or to increase the tension in the conveyor belt.

15. The conveyor apparatus of claim 14 wherein said actuator is a hydraulic cylinder actuator having an actuator rod, said pulley support member has a belt control arm extending substantially horizontally and exterior to said one pulley device, and said hydraulic cylinder actuator is pivotally connected to one end of said belt control arm.

16. The conveyor apparatus of claim 14 wherein said adjusting mechanism includes a winch mounted on said conveyor support frame and an elongate, flexible member connected to said winch for winding thereon or unwinding therefrom, one end of said flexible member being connected to said movable support device, and wherein operation of said winch can cause said flexible member to pull on said support device and thereby move said pulley support member and its pulley device away from the other pulley device.

17. The conveyor apparatus of claim 14 including two sensor devices for sensing a shift of said conveyor belt out of a desired central region of said one pulley device and for indicating said shift to an electronic controller adapted to control operation of said actuator, said sensor devices each being arranged near a respective one of two opposite end sections of said one pulley device.

18. The conveyor apparatus of claim 14 wherein said conveyor apparatus is a low profile conveyor vehicle having a height not exceeding five feet and includes a pair of transversely aligned wheel units for supporting and moving said conveyor apparatus, each wheel unit having a wheel support structure connected to a respective one of two longitudinal sides of the support frame and a wheel mounted on said wheel support structure for pivotable movement about a respective, substantially vertical pivot axis for steering the conveyor apparatus.

19. The conveyor apparatus of claim 14 wherein said one pulley device comprises two tail pulley sections each mounted on said pulley support member for rotation about a common central axis of rotation, said tail pulley sections having adjacent inner ends, said pulley support member having a central support portion located at the inner ends of the pulley sections and extending radially outwardly from said inner ends relative to said axis of rotation to said pivot axis where a pivot pin connects said pulley support member to said support device.

* * * * *

UNITED STATES PATENT AND TRADEMARK OFFICE
CERTIFICATE OF CORRECTION

| | | |
|---|---|---|
| PATENT NO. | : 7,866,462 B2 | Page 1 of 1 |
| APPLICATION NO. | : 12/462278 | |
| DATED | : January 11, 2011 | |
| INVENTOR(S) | : Maurice DeMong | |

It is certified that error appears in the above-identified patent and that said Letters Patent is hereby corrected as shown below:

On the Title page, the Assignee name is corrected to read:

(73) Assignee: Prairie Machine & Parts Mfg. (1978) Ltd., Saskatoon (CA)

Signed and Sealed this
First Day of March, 2011

David J. Kappos
*Director of the United States Patent and Trademark Office*